United States Patent
Leontaris et al.

(10) Patent No.: US 11,336,915 B2
(45) Date of Patent: May 17, 2022

(54) GLOBAL MOTION VECTOR VIDEO ENCODING SYSTEMS AND METHODS

(71) Applicant: Apple Inc., Cupertino, CA (US)

(72) Inventors: Athanasios Leontaris, Cupertino, CA (US); Guy Côté, Aptos, CA (US); Mark P. Rygh, Union City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/066,451

(22) Filed: Oct. 8, 2020

(65) Prior Publication Data

US 2021/0029376 A1     Jan. 28, 2021

Related U.S. Application Data

(63) Continuation of application No. 16/032,925, filed on Jul. 11, 2018, now Pat. No. 10,812,823.

(51) Int. Cl.
| | |
|---|---|
| *H04N 19/527* | (2014.01) |
| *H04N 19/436* | (2014.01) |
| *H04N 19/577* | (2014.01) |
| *H04N 19/196* | (2014.01) |
| *H04N 19/139* | (2014.01) |
| *H04N 19/176* | (2014.01) |
| *H04N 19/105* | (2014.01) |
| *H04N 19/147* | (2014.01) |

(52) U.S. Cl.
CPC ......... *H04N 19/527* (2014.11); *H04N 19/105* (2014.11); *H04N 19/139* (2014.11); *H04N 19/176* (2014.11); *H04N 19/196* (2014.11); *H04N 19/436* (2014.11); *H04N 19/577* (2014.11); *H04N 19/147* (2014.11)

(58) Field of Classification Search
None
See application file for complete search history.

(56) References Cited

U.S. PATENT DOCUMENTS

| | | |
|---|---|---|
| 9,106,888 B2 | 8/2015 | Chou |
| 9,215,472 B2 | 12/2015 | Orr et al. |
| 9,218,639 B2 | 12/2015 | Cote et al. |
| 9,224,186 B2 | 12/2015 | Rygh et al. |
| 9,224,187 B2 | 12/2015 | Cote et al. |
| 9,270,999 B2 | 2/2016 | Cote et al. |
| 9,292,899 B2 | 3/2016 | Schaub et al. |
| 9,299,122 B2 | 3/2016 | Okruhlica et al. |
| 9,305,325 B2 | 4/2016 | Cheng et al. |

(Continued)

*Primary Examiner* — Lindsay J Uhl
(74) *Attorney, Agent, or Firm* — Fletcher Yoder, P.C.

(57) ABSTRACT

Systems and methods for improving operational efficiency of a video encoding system used to encode image data are provided. In embodiments, the video encoding system includes a low resolution pipeline that includes a low resolution motion estimation block, which generates downscaled image data by reducing resolution of the image data and performs a motion estimation search using the downscaled image data and previously downscaled image data. The video encoding system also includes a main encoding pipeline in parallel with the low resolution pipeline that includes a motion estimation block, which determines a global motion vector based on data from the low resolution motion estimation block. The main encoding pipeline may utilize the global motion vector in determining a candidate inter prediction mode.

20 Claims, 16 Drawing Sheets

(56) References Cited

U.S. PATENT DOCUMENTS

| | | |
|---|---|---|
| 9,336,558 B2 | 5/2016 | Cote et al. |
| 9,351,003 B2 | 5/2016 | Cote et al. |
| 9,380,312 B2 | 6/2016 | Cote et al. |
| 2005/0276328 A1* | 12/2005 | Sakamoto ............ H04N 19/527 375/240.16 |
| 2007/0171981 A1* | 7/2007 | Qi .......................... G06T 7/223 375/240.24 |
| 2007/0237232 A1 | 10/2007 | Chang et al. |
| 2008/0107307 A1 | 5/2008 | Altherr |
| 2014/0126638 A1 | 5/2014 | Sievers |
| 2015/0092833 A1 | 4/2015 | Ku et al. |
| 2015/0092843 A1 | 4/2015 | Millet et al. |
| 2015/0092855 A1 | 4/2015 | Chou et al. |
| 2016/0007038 A1 | 1/2016 | Chou et al. |
| 2016/0021385 A1 | 1/2016 | Chou et al. |
| 2017/0094311 A1* | 3/2017 | Chou ................... H04N 19/186 |
| 2019/0215518 A1* | 7/2019 | Alagappan ........... H04N 19/139 |

* cited by examiner

GLOBAL MOTION VECTOR VIDEO ENCODING SYSTEMS AND METHODS

CROSS-REFERENCE TO RELATED APPLICATIONS

This application is a continuation of and claims priority to U.S. application Ser. No. 16/032,925, filed Jul. 11, 2018, entitled, "Global Motion Vector Video Encoding Systems and Methods," the disclosure of which is incorporated by reference in its entirety for all purposes.

BACKGROUND

The present disclosure generally relates to video (e.g., image data) encoding and, more particularly, to motion estimation used for image data encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information, for example, as text, still images, and/or video based on corresponding image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of its display pixels based on the decoded image data.

To facilitate encoding, prediction techniques may be used to indicate the image data by referencing other image data. For example, since successively displayed images (e.g., image frames) may be generally similar, inter (e.g., interframe) prediction techniques may be used to indicate image data (e.g., a prediction unit) corresponding with a first image frame by referencing image data (e.g., a reference sample) corresponding with a second image frame, which may be displayed before or after the first image frame. To facilitate identifying the reference sample, a motion vector may indicate position of a reference sample in the second image frame relative to position of a prediction unit in the first image frame. In other words, instead of directly compressing the image data, the image data may be encoded based at least in part on a motion vector used to indicate desired value of the image data.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded, for example, using inter prediction techniques. However, determining motion vectors used to encode image data with inter prediction techniques may be computationally complex, for example, due to amount of image data searched to determine candidate motion vectors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. To facilitate, a video encoding system may determine encoding parameters and implement the encoding parameters to encode the source image data. In some embodiments, the source image data may be encoded using prediction techniques (e.g., inter prediction techniques) by referencing other image data. For example, inter prediction techniques may facilitate encoding source image data by referencing image data used to display other image frames.

To implement inter prediction techniques, the video encoding system may determine a reference sample in a second (e.g., reference) image frame for source image data corresponding with a first image frame using an inter prediction mode. In some embodiments, the inter prediction mode may include a motion vector that indicates position (e.g., spatial position) of the reference sample in the second image frame relative to position of the source image data in the first image frame. Additionally, the inter prediction mode may include a reference index that indicates display order (e.g., temporal position) of the second image frame relative to the first image frame.

To determine the inter prediction mode, a motion estimation (ME) block in the video encoding system may determine one or more candidate inter prediction modes. In some embodiments, the motion estimation block may perform a motion estimation search to determine reference samples that are similar to the source image data. Once a reference sample is determined, the motion estimation block may determine a motion vector and reference index to indicate location (e.g., spatial position and temporal position) of the reference sample relative to the source image data. Generally, performing motion estimation searches may be computationally complex and, thus, time consuming. However, a duration provided for the motion estimation block to perform its search may be limited, particularly to enable real-time or near real-time transmission or display as refresh rate and/or resolution increases.

Accordingly, the present disclosure provides techniques to improve operational efficiency of the video encoding system. In some embodiments, operational efficiency may be improved by including a low resolution pipeline in parallel with a main encoding pipeline, which determines encoding parameters used to encode the source image data. Additionally, in some embodiments, the low resolution pipeline and the main encoding pipeline may both be provided access via direct memory access (DMA) to source image data stored in memory.

Thus, in such embodiments, the low resolution pipeline and the main encoding pipeline may operate using relatively independent operational timing, which may enable the low resolution pipeline to operate one or more image frames ahead of the main encoding pipeline. In this manner, the low resolution pipeline may determine information ahead of time for use in the main encoding pipeline. By running the low resolution pipeline at least one image frame ahead of the main encoding pipeline, information (e.g., statistics and/or low resolution inter prediction modes) determined by the low resolution pipeline may be used by the main encoding pipeline, for example, to determine motion-weight (e.g., lambda) tuning information used in rate-distortion calculations, frame-rate conversion, image stabilization, and/or the like.

For example, the low resolution pipeline may include a low resolution motion estimation (LRME) block that processes the source image data to determine low resolution inter prediction modes. In some embodiments, the low resolution motion estimation block may downscale the source image data and perform a motion estimation search on previously downscaled image data, which may be derived from full-resolution samples of image data used as references in the motion estimation search, to determine a downscaled reference sample that is similar to the downscaled source image data. To indicate location of the downscaled reference sample, the low resolution motion estimation block may determine a low resolution inter prediction mode, which includes a motion vector and a reference index.

Since downscaled image data should be similar to full resolution image data, low resolution inter prediction modes may provide an indication where reference samples in full resolution are expected to be located. Accordingly, the motion estimation block in the main encoding pipeline may be initialized with the low resolution inter prediction modes as candidates. In this manner, the low resolution motion estimation block may facilitate reducing amount of image data searched by the motion estimation block and, thus, improving operational efficiency of the video encoding system. To facilitate further improving processing efficiency, in some embodiments, the low resolution motion estimation block may prune the low resolution inter prediction modes before they are evaluated as candidate inter prediction modes by the main encoding pipeline, for example, to consolidate similar low resolution inter prediction modes and, thus, to enable the number of candidate inter prediction modes evaluated by the main encoding pipeline to be reduced.

Additionally, when the low resolution motion estimation block is operating one or more image frame ahead of the main encoding pipeline, the low resolution motion estimation block may determine statistics based at least in part on luma of the source image data. In some embodiments, the statistics may be indicative of global motion across multiple image frames and, thus, used for image stabilization. For example, the low resolution motion estimation block may determine a histogram statistic used to determine a best motion vector and, thus, a global motion vector determined based at least in part on the best motion vector. Based on the global motion statistics, the motion estimation block, which may be implemented in the main encoding pipeline, may determine a global motion vector indicative of motion across multiple image frames. Additionally, based on the global motion vector, the motion estimation block may adjust the candidate inter prediction modes considered, for example, by adjusting (e.g., offsetting) their motion vectors based at least in part on the global motion vector. Furthermore a search area in image data may be adjusted based on the global motion vector.

BRIEF DESCRIPTION OF THE DRAWINGS

Various aspects of this disclosure may be better understood upon reading the following detailed description and upon reference to the drawings in which.

DETAILED DESCRIPTION

Figure 1:
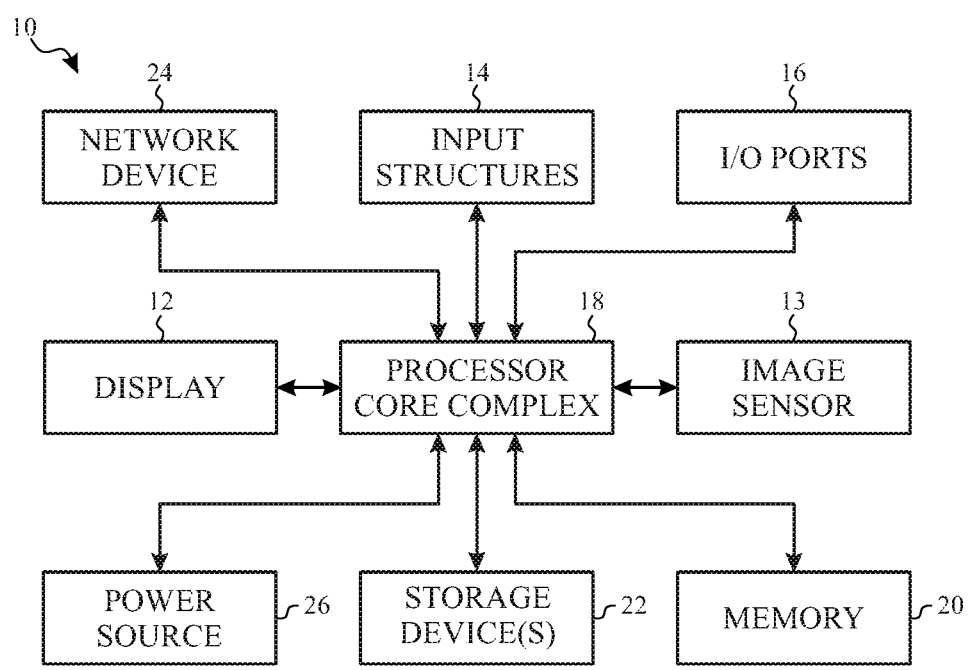
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

An electronic device may facilitate visually presenting information by instructing an electronic display to display one or more images (e.g., image frames) based on corresponding image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

In some embodiments, a video encoding system may determine encoding parameters and implement the encoding parameters to encode source image data. To facilitate encoding, source image data for an image may be divided into one or more coding units. As used herein, a "coding unit" is intended to describe a sample of source image data (e.g., pixel image data) corresponding to a group of display pixels, which is encoded using the same prediction technique.

Accordingly, the video encoding system may determine a prediction technique (e.g., intra prediction technique or inter prediction technique) to be implemented to predict a coding unit, for example, as one or more prediction samples. Prediction techniques may facilitate encoding by enabling the source image data to be indicated via reference to other image data. For example, since an image frame may change gradually, the video encoding system may utilize intra prediction techniques to produce a prediction sample based on image data used to display the same image. Additionally, since successively displayed images may change gradually, the video encoding system may utilize inter prediction techniques to produce a prediction sample based on image data used to display other images.

Although conceptually similar, each prediction technique may include one or more prediction modes that utilize different encoding schemes. In other words, implementing different prediction modes may result in different prediction samples. For example, utilizing a first intra prediction mode (e.g., vertical prediction mode), the video encoding system may produce a prediction sample with each column set equal to image data for a pixel directly above the column. On the other hand, utilizing a second intra prediction mode (e.g., DC prediction mode), the video encoding system may produce a prediction sample set equal to an average of adjacent pixel image data. Additionally, utilizing a first inter prediction mode (e.g., first reference index and first motion vector), the video encoding system may produce a prediction sample based on a reference sample at a first position within a first image frame. On the other hand, utilizing a second inter prediction mode (e.g., second reference index and second motion vector), the video encoding system may produce a prediction sample based on a reference sample at a second position within a second image frame.

Although using the same prediction technique, a coding unit may be predicted using one or more different prediction modes. As using herein, a "prediction unit" is intended to describe a sample within a coding unit that utilizes the same prediction mode. In some embodiments, a coding unit may include a single prediction unit. In other embodiments, the coding unit may be divided into multiple prediction units, which each uses a different prediction mode.

Accordingly, the video encoding system may evaluate candidate prediction modes (e.g., candidate inter prediction modes, candidate intra prediction modes, and/or a skip mode) to determine what prediction mode to use for each prediction unit in a coding unit. To facilitate, a motion estimation (ME) block in the video encoding system may determine one or more candidate inter prediction modes. In some embodiments, an inter prediction mode may include a reference index (e.g., temporal position), which indicates which image a reference sample is located, and a motion vector (e.g., spatial position), which indicates position of the reference sample relative to a prediction unit.

To determine a candidate inter prediction mode, the motion estimation block may search image data (e.g., reconstructed samples) used to display other image frames for reference samples that are similar to a prediction unit. Once a reference sample is determined, the motion estimation block may determine a motion vector and reference index to indicate location of the reference sample.

Generally, the quality of the match between prediction unit and reference sample may be dependent on search area (e.g., amount of image data). For example, increasing search area may improve likelihood of finding a closer match with the prediction unit. However, increasing search area may also increase computation complexity as well as increase memory bandwidth utilized to perform searches, which may cause increases in searching duration. In some embodiments, duration provided for the motion estimation block to perform its search may be limited, for example, to enable real-time or near real-time transmission and/or display.

Accordingly, as will be described in more detail below, the present disclosure provides techniques to facilitate improving operational efficiency of a video encoding system, for example, by enabling search area and/or candidate prediction modes evaluated by a main encoding pipeline to be adaptively (e.g., dynamically) adjusted based at least in part on processing performed by a low resolution pipeline. In some embodiments, operational efficiency may be improved by including a low resolution pipeline in parallel with the main encoding pipeline. Additionally, in some embodiments, the low resolution pipeline and the main encoding pipeline may both be provided access via direct memory access (DMA) to source image data stored in memory.

Thus, in some embodiments, the low resolution pipeline and the main encoding pipeline may operate using relatively independent operational timing. In fact, the low resolution pipeline may operate one or more image frames ahead of the main encoding pipeline. In this manner, the low resolution pipeline may process image data ahead of time to determine information (e.g., low resolution inter prediction modes, luma histogram statistics, and/or sum of absolute difference statistics) to be used in the main encoding pipeline.

To facilitate determining the relevant information, the low resolution pipeline may include a low resolution motion estimation (LRME) block. In some embodiments, the low resolution motion estimation block may downscale source image data (e.g., a coding unit). For example, a low resolution motion estimation block may downscale a 32×32 coding unit to one-sixteenth resolution to generate an 8×8 downscaled coding unit.

The low resolution motion estimation block may then search previously downscaled source image data to find (e.g., identify) a downscaled reference sample that is similar to a downscaled prediction unit within the downscaled coding unit. To indicate location of the downscaled reference sample, the low resolution motion estimation block may determine a low resolution inter prediction mode, which includes a motion vector and a reference index. More specifically, the motion vector may indicate spatial position of a reference sample in full resolution corresponding with the downscaled reference sample relative to a prediction unit in full resolution corresponding with the downscaled prediction unit. Additionally, the reference index may indicate display order (e.g., temporal position) of a reference image frame corresponding with the downscaled reference sample relative to an image frame corresponding with the downscaled prediction unit.

The low resolution motion estimation block may then enable the low resolution inter prediction mode to be accessed and used by the main encoding pipeline. In some embodiments, the low resolution motion estimation block may store the low resolution inter prediction mode in memory using direct memory access and the main encoding pipeline may retrieve the low resolution inter prediction mode using direct memory access. Additionally, the low resolution motion estimation block may store the downscaled source image data in memory for use in subsequent low resolution motion estimation searches.

In some embodiments, the motion estimation block in the main encoding pipeline may retrieve candidate inter prediction modes from memory. For each candidate inter prediction mode, the motion estimation block may perform a motion estimation search within a range of pixels (e.g., +/−3 pixel area) and/or sub-pixels (e.g., +/−0.5 pixel area) around its indicated reference sample in full resolution. Since downscaled image data should be similar to full resolution image data, low resolution inter prediction modes may provide an indication where closely matching reference samples are expected to be located. As such, the motion estimation block may utilize the low resolution inter prediction modes as candidates. In this manner, the low resolution motion estimation block may facilitate reducing amount of image data searched by the motion estimation block and, thus, searching duration, which may facilitate real-time or near real-time transmission and/or display of image data.

Additionally, when operating one or more image frames ahead of the main encoding pipeline, the low resolution motion estimation block may determine statistics used to improve operational efficiency of the main encoding pipeline. For example, the low resolution motion estimation block may determine luma histogram statistics that indicate number of pixels in downscaled image data at each luma value. Additionally or alternatively, the low resolution motion estimation block may determine a zero vector sum of absolute difference (SAD) statistics, which may indicate difference between a downscaled prediction unit and a downscaled reference sample indicated by a zero vector. In some embodiments, the statistics may be used to detect when a scene change is expected to occur.

As described above, inter prediction techniques are premised on successively displayed image frames being similar. Thus, effectiveness of inter prediction techniques across a scene change may be greatly reduced. As such, the main encoding pipeline may select a prediction mode from one or more candidate intra prediction modes and/or a skip mode. Thus, in some embodiments, the motion estimation block may be disabled, which may facilitate further reducing computational complexity, improving operational efficiency, and/or reducing power consumption of the main encoding pipeline and, thus, an electrical device in which it is implemented.

To help illustrate, an electronic device 10 (e.g., computing device) that may utilize an electronic display 12 to display image frames based on image data and/or an image sensor 13 to capture image data is described in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, an image sensor 13, one or more input structures 14 (e.g., input devices), one or more input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

In any case, as depicted, the processor core complex 18 is operably coupled with the local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor core complex 18. For example, the local memory 20 may include random access memory (RAM) and the main memory storage device 22 may include read only memory (ROM), rewritable non-volatile memory such as flash memory, hard drives, optical discs, and the like. By way of example, a computer program product containing the instructions may include an operating system or an application program.

Additionally, as depicted, the processor core complex 18 is operably coupled with the network interface 24. Using the network interface 24, the electronic device 10 may communicatively couple to a network and/or other computing devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

Furthermore, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output encoded image data to the portable storage device and/or receive encoding image data from the portable storage device.

As depicted, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter. Furthermore, as depicted, the processor core complex 18 is operably coupled with input structures 14, which may enable a user to interact with the electronic device 10. The inputs structures 14 may include buttons, keyboards, mice, trackpads, and/or the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may present visual representations of information by display images (e.g., image frames), such as a graphical user interface (GUI) of an operating system, an application interface, a still image, or video content. As described above, the electronic display 12 may display an image based on corresponding image data. In some embodiments, the image data may be received from other electronic devices 10, for example, via the network interface 24 and/or the I/O ports 16. Additionally or alternatively, the image data may be generated by electronic device 10 using the image sensor 13. In some embodiments, image sensor 13 may digitally capture visual representations of proximate physical features as image data.

As described above, the image data may be encoded (e.g., compressed), for example by the electronic device 10 that generated the image data, to reduce number of memory addresses used to store and/or bandwidth used to transmit the image data. Once generated or received, the encoded image data may be stored in local memory 20. Accordingly, to an display image corresponding with encoded image data, the processor core complex 18 or other image data processing circuitry may retrieve encoded image data from local memory 20, decode the encoded image data, and instruct the electronic display 12 to display image frames based on the decoded image data.

Figure 2:
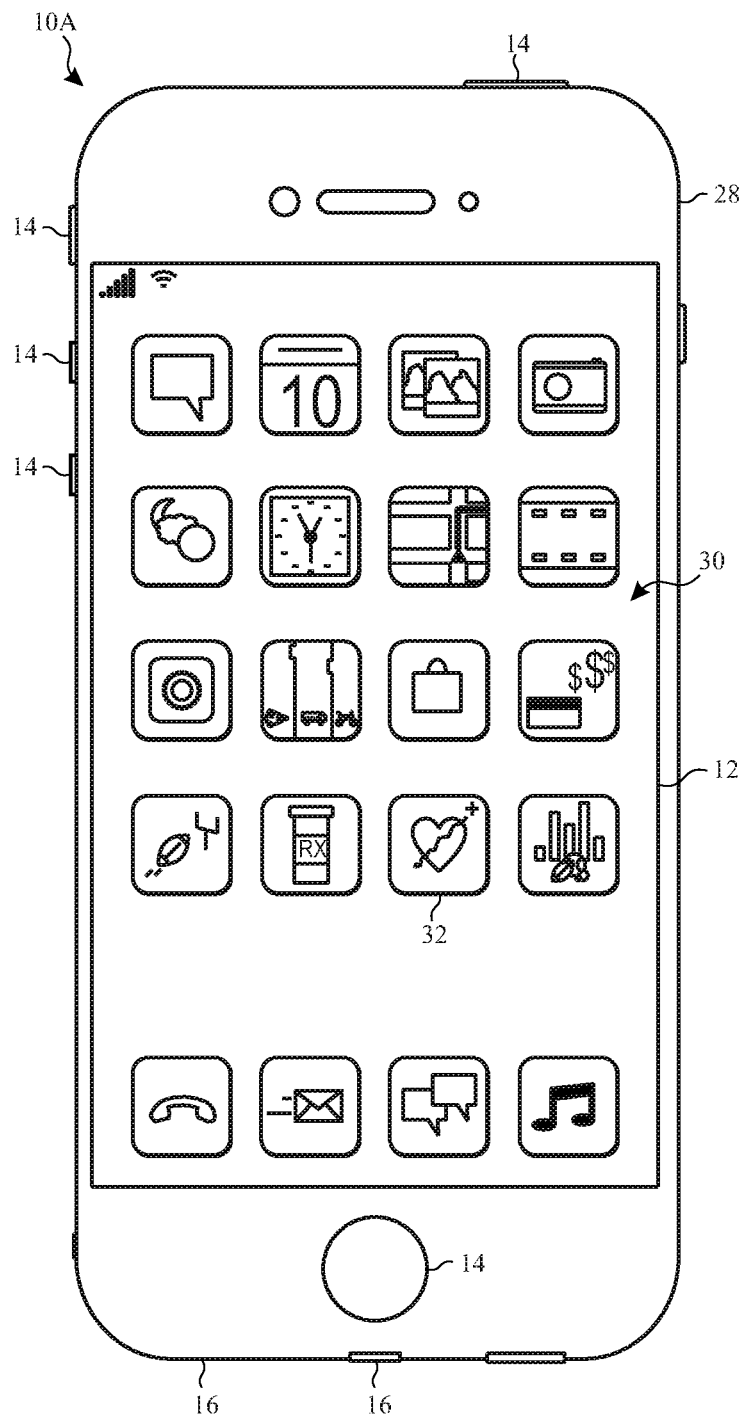
FIG. 2 is an example of the electronic device of FIG. 1, in accordance with an embodiment.

As described above, the electronic device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
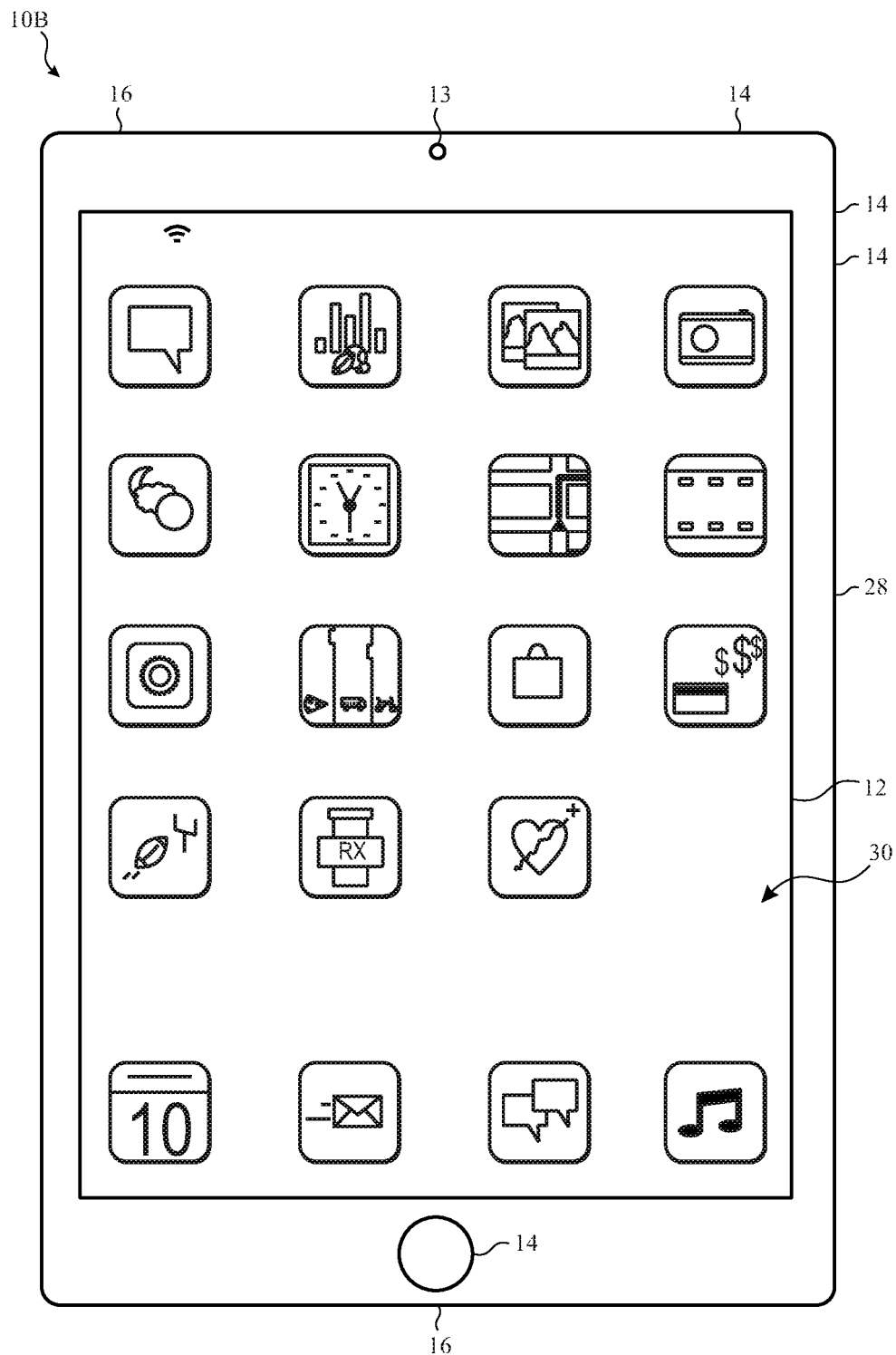
FIG. 3 is another example of the electronic device of FIG. 1, in accordance with an embodiment.
Figure 4:
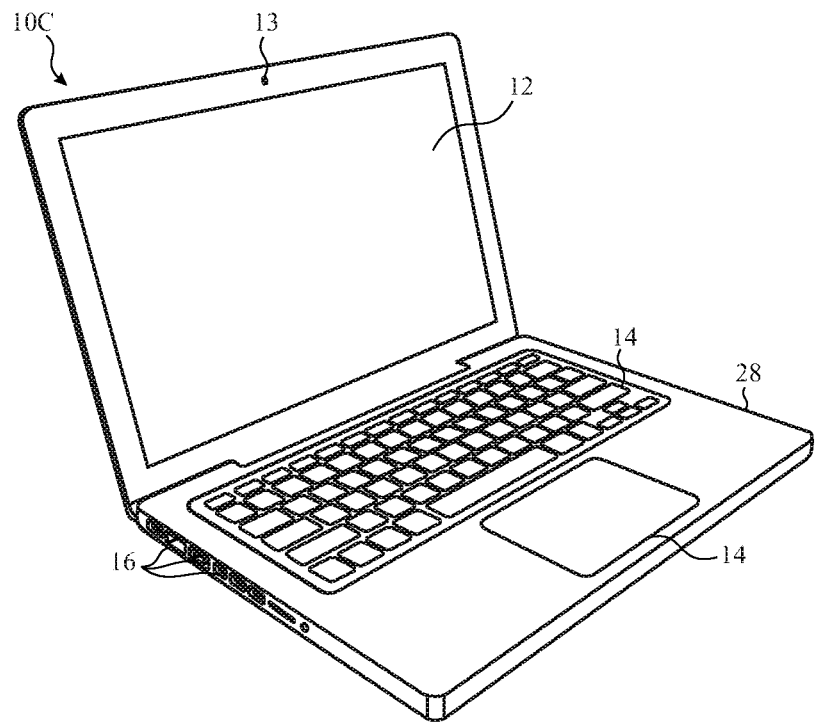
FIG. 4 is another example of the electronic device of FIG. 1, in accordance with an embodiment.
Figure 5:
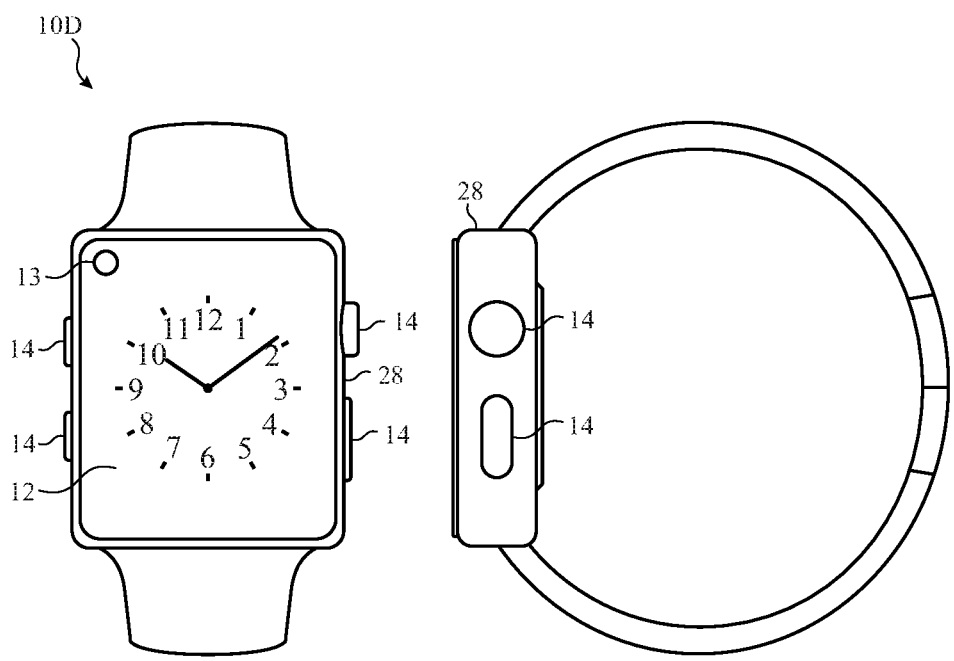
FIG. 5 is another example of the electronic device of FIG. 1, in accordance with an embodiment.

To further illustrate a suitable electronic device 10, a tablet device 10B is described in FIG. 3. For example, the tablet device 10B may be any iPad® model available from Apple Inc. Additionally, in other embodiments, the electronic device 10 may take the form of a computer 10C as described in FIG. 4. For example, the computer 10C may be any Macbook® or iMac® model available from Apple Inc. Furthermore, in other embodiments, the electronic device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of a corresponding image based on the image data may be limited to enable real-time or near real-time display and/or transmission. For example, image data captured by the image sensor 13 may be displayed on the electronic display 12 with minimal delay to enable a user to determine physical features proximate the image sensor 13 in real-time or near real-time. Additionally, image data generated by the electronic device 10 (e.g., by the image sensor 13) may be transmitted (e.g., broadcast) to one or more other electronic devices 10 to enable a real-time or near real-time streaming. To enable real-time or near real-time transmission and/or display, duration available to encode image data may be limited—particularly as the resolution of images and/or refresh rates of electronic displays 12 increase.

Figure 6:
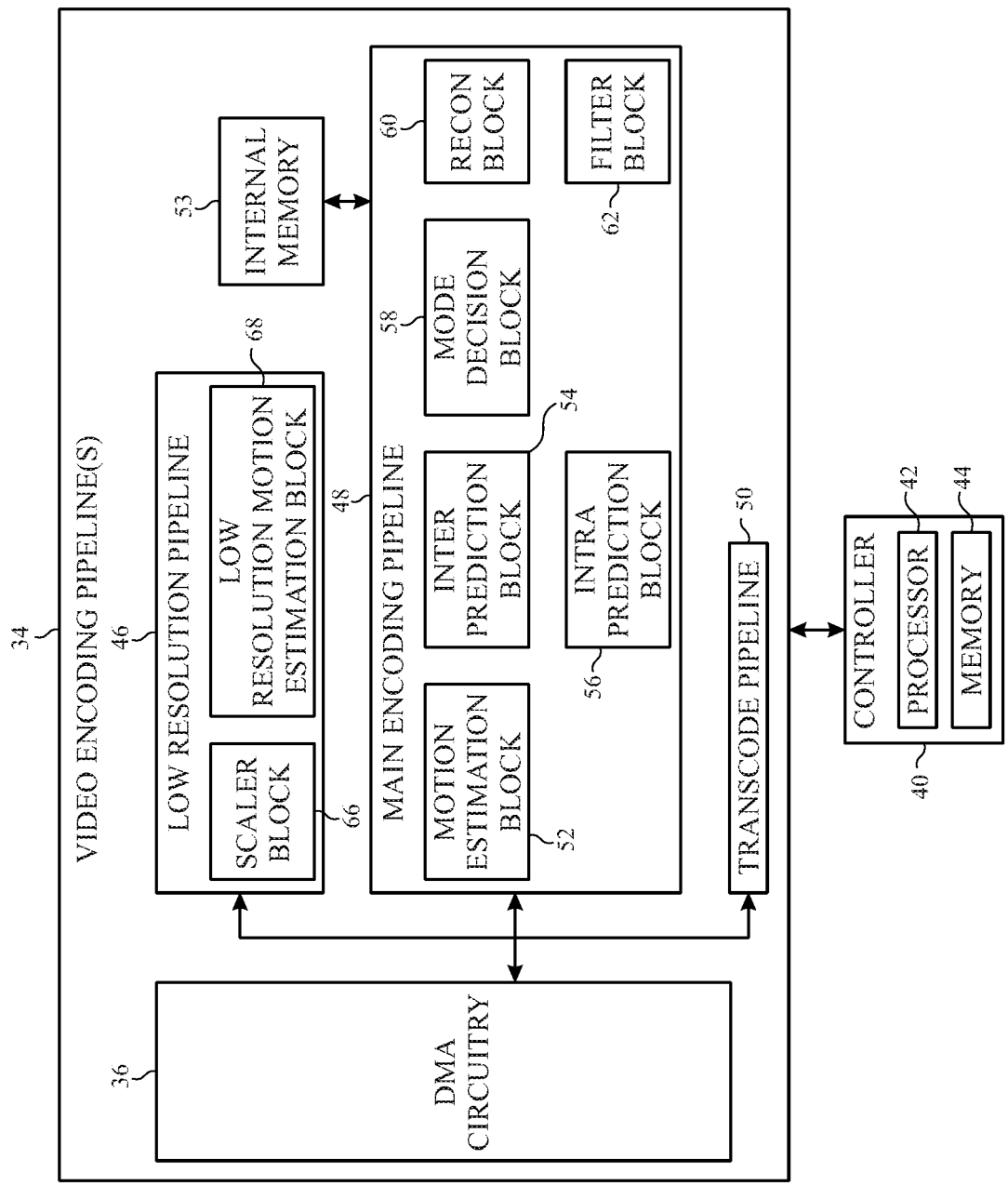
FIG. 6 is block diagram of a portion of the electronic device of FIG. 1 including a video encoding system, in accordance with an embodiment.

To help illustrate, an example of a portion of an electronic device 10, which includes a video encoding system 34, is shown in FIG. 6. In some embodiments, the video encoding system 34 may be implemented via circuitry, for example, packaged as a system-on-chip (SoC). Additionally or alternatively, the video encoding system 34 may be included in the processor core complex 18, a timing controller (TCON) in the electronic display 12, one or more other processing units, other processing circuitry, or any combination thereof.

In any case, as in the depicted embodiment, the video encoding system 34 may be communicatively coupled to a controller 40. In some embodiments, the controller 40 may generally control operation of the video encoding system 34. Although depicted as a single controller 40, in other embodiments, one or more separate controllers 40 may be used to control operation of the video encoding system 34. Additionally, in some embodiments, the controller 40 may be implemented in the video encoding system 34, for example, as a dedicated video encoding controller.

To facilitate controlling operation, the controller 40 may include a controller processor 42 and controller memory 44. In some embodiments, the controller processor 42 may execute instructions and/or process data stored in the controller memory 44 to control operation of the video encoding system 34. In other embodiments, the controller processor 42 may be hardwired with instructions that control operation of the video encoding system 34. Additionally, in some embodiments, the controller processor 42 may be included in the processor core complex 18 and/or separate processing circuitry (e.g., in the electronic display) and the controller memory 44 may be included in local memory 20, main memory storage device 22, and/or a separate, tangible, non-transitory computer-readable medium (e.g., in the electronic display).

As depicted, the video encoding system 34 includes DMA circuitry 36. In some embodiments, the DMA circuitry 36 may communicatively couple the video encoding system 34 to an image source, such as external memory that stores source image data, for example, generated by the image sensor 13.

To facilitate generating encoded image data, the video encoding system 34 may include multiple parallel pipelines. For example, in the depicted embodiment, the video encoding system 34 includes a low resolution pipeline 46, a main encoding pipeline 48, and a transcode pipeline 50. As will be described in more detail below, the main encoding pipeline 48 may encode source image data using prediction techniques (e.g., inter prediction techniques or intra prediction techniques) and the transcode pipeline 50 may subsequently entropy encode syntax elements that indicate encoding parameters (e.g., quantization coefficient, inter prediction mode, and/or intra prediction mode) used to prediction encode the image data.

To facilitate prediction encoding source image data, the main encoding pipeline 48 may perform various functions. To simplify discussion, the functions are divided between various blocks (e.g., circuitry or modules) in the main encoding pipeline 48. In the depicted embodiment, the main encoding pipeline 48 includes a motion estimation block 52, an inter prediction block 54, an intra prediction block 56, a mode decision block 58, a reconstruction block 60, and a filter block 64.

As depicted, the motion estimation block 52 is communicatively coupled to the DMA circuitry 36. In this manner, the motion estimation block 52 may receive source image data via the DMA circuitry 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit.

In some embodiments, a luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half (e.g., half resolution in the horizontal direction) the resolution of the coding unit when a 4:2:2 sampling format is used and a quarter (e.g., half resolution in the horizontal direction and half resolution in the vertical direction) the resolution of the coding unit when a 4:2:0 sampling format is used.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of the prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter prediction modes that can be used to encode a prediction unit. As described above, an inter prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter prediction mode, the motion estimation block 52 may search reconstructed luma image data, which may be previously generated by the reconstruction block 60 and stored in internal memory 53 (e.g., reference memory) of the video encoding system 34. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample. The values of the horizontal and vertical offsets may also be referred to as x-components and y-components, respectively.

In this manner, the motion estimation block 52 may determine candidate inter prediction modes (e.g., reference index and motion vector) for one or more prediction units in the coding unit. The motion estimation block 52 may then input candidate inter prediction modes to the inter prediction block 54. Based at least in part on the candidate inter prediction modes, the inter prediction block 54 may determine luma prediction samples (e.g., predictions of a prediction unit).

In some embodiments, the inter prediction block 54 may determine a luma prediction sample by applying motion compensation to a reference sample indicated by a candidate inter prediction mode. For example, the inter prediction block 54 may apply motion compensation by determining luma of the reference sample at fractional (e.g., quarter or half) pixel positions. The inter prediction block 54 may then input the luma prediction sample and corresponding candidate inter prediction mode to the mode decision block 58 for consideration. In some embodiments, the inter prediction block 54 may sort the candidate inter prediction modes based on associated mode cost and input only a specific number to the mode decision block 58.

The mode decision block 58 may also consider one or more candidate intra predictions modes and corresponding luma prediction samples output by the intra prediction block 56. The main encoding pipeline 48 may be capable of implementing multiple (e.g., 17 or 35) different intra prediction modes to generate luma prediction samples based on adjacent pixel image data. Thus, in some embodiments, the intra prediction block 56 may determine a candidate intra prediction mode and corresponding luma prediction sample for a prediction unit based at least in part on luma of reconstructed image data for adjacent (e.g., top, top right, left, or bottom left) pixels, which may be generated by the reconstruction block 60.

For example, utilizing a vertical prediction mode, the intra prediction block 56 may set each column of a luma prediction sample equal to reconstructed luma of a pixel directly above the column. Additionally, utilizing a DC prediction mode, the intra prediction block 56 may set a luma prediction sample equal to an average of reconstructed luma of pixels adjacent the prediction sample. The intra prediction block 56 may then input candidate intra prediction modes and corresponding luma prediction samples to the mode decision block 58 for consideration. In some embodiments, the intra prediction block 56 may sort the candidate intra prediction modes based on associated mode cost and input only a specific number to the mode decision block 58.

The mode decision block 58 may determine encoding parameters to be used to encode the source image data (e.g., a coding unit). In some embodiments, the encoding parameters for a coding unit may include prediction technique (e.g., intra prediction techniques or inter prediction techniques) for the coding unit, number of prediction units in the coding unit, size of the prediction units, prediction mode (e.g., intra prediction modes or inter prediction modes) for each of the prediction units, number of transform units in the coding unit, size of the transform units, whether to split the coding unit into smaller coding units, or any combination thereof.

To facilitate determining the encoding parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra prediction techniques.

On the other hand, in a P-frame or B-frame, source image data may be encoded by referencing image data used to display the same image frame and/or a different image frames. More specifically, in a P-frame, source image data may be encoding by referencing image data associated with a previously coded or transmitted image frame. Additionally, in a B-frame, source image data may be encoded by referencing image data used to code two previous image frames. More specifically, with a B-frame, a prediction sample may be generated based on prediction samples from two previously coded frames; the two frames may be different from one another or the same as one another. Accordingly, when the image frame is a P-frame or a B-frame, the mode decision block 58 may determine that each coding unit in the image frame may be prediction encoded using either intra techniques or inter techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe number, size, location, and prediction mode of luma prediction blocks in a coding unit. Thus, the mode decision block 58 may determine a candidate inter prediction mode configuration using one or more of the candidate inter prediction modes received from the inter prediction block 54. Additionally, the mode decision block 58 may determine a candidate intra prediction mode configuration using one or more of the candidate intra prediction modes received from the intra prediction block 56.

Since a coding unit may utilize the same prediction technique, the mode decision block 58 may determine prediction technique for the coding unit by comparing rate-distortion metrics (e.g., costs) associated with the candidate prediction mode configurations and/or a skip mode. In some embodiments, the rate-distortion metric may be determined as follows:

$$RD = A(\text{rate}) + B(\text{distortion}) \quad (1)$$

where RD is the rate-distortion metric, rate is an estimated rate that indicates number of bits expected to be used to indicate encoding parameters, distortion is a distortion metric (e.g., sum of squared difference) resulting from the encoding parameters, A is a weighting factor for the estimated rate, and B is a weighting factor for the distortion metric. The weighting factor A may be a Lagrangian multiplier, and the weighting factor A may depend on a quantization parameter associated with image data being processed.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the reconstruction block 60. Additionally or alternatively, the distortion metric may be a sum of absolute transformed difference (SATD) between the luma coding block and reconstructed luma image data received from the reconstruction block 60.

In some embodiments, prediction residuals (e.g., differences between source image data and prediction sample) resulting in a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra prediction mode configuration may include expected number of bits used to indicate intra prediction technique (e.g., coding unit overhead), expected number of bits used to indicate intra prediction mode, expected number of bits used to indicate a prediction residual (e.g., source image data—prediction sample), and expected number of bits used to indicate a transform unit split. On the other hand, the estimated rate for an inter prediction mode configuration may include expected number of bits used to indicate inter prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

In embodiments where the rate-distortion metric of equation (1) is used, the mode decision block 58 may select a prediction mode configuration or skip mode with the lowest associated rate-distortion metric for a coding unit. In this manner, the mode decision block 58 may determine encoding parameters for a coding unit, which may include prediction technique (e.g., intra prediction techniques or inter prediction techniques) for the coding unit, number of prediction units in the coding unit, size of the prediction units, prediction mode (e.g., intra prediction modes or inter prediction modes) for each of the prediction unit, number of transform units in the coding block, size of the transform units, whether to split the coding unit into smaller coding units, or any combination thereof.

To facilitate improving perceived image quality resulting from decoded image data, the main encoding pipeline 48 may then mirror decoding of encoded image data. To facilitate, the mode decision block 58 may output the encoding parameters and/or luma prediction samples to the reconstruction block 60. Based on the encoding parameters and reconstructed image data associated with one or more adjacent blocks of image data, the reconstruction block 60 may reconstruct image data.

More specifically, the reconstruction block 60 may generate the luma component of reconstructed image data. In some embodiments, the reconstruction block 60 may generate reconstructed luma image data by subtracting the luma prediction sample from luma of the source image data to determine a luma prediction residual. The reconstruction block 60 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The reconstruction block 60 may then add the reconstructed luma prediction residual to the luma prediction sample to determine reconstructed luma image data. As described above, the reconstructed luma image data may then be fed back for use in other blocks in the main encoding pipeline 48, for example, via storage in internal memory 53 of the main encoding pipeline 48. Additionally, the reconstructed luma image data may be output to the filter block 62.

The reconstruction block 60 may also generate both chroma components of reconstructed image data. In some embodiments, chroma reconstruction may be dependent on sampling format. For example, when luma and chroma are sampled at the same resolution (e.g., 4:4:4 sampling format), the reconstruction block 60 may utilize the same encoding parameters as used to reconstruct luma image data. In such embodiments, for each chroma component, the reconstruction block 60 may generate a chroma prediction sample by applying the prediction mode configuration determined by the mode decision block 58 to adjacent pixel image data.

The reconstruction block 60 may then subtract the chroma prediction sample from chroma of the source image data to determine a chroma prediction residual. Additionally, the reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, which may be input to the filter block 64.

However, in other embodiments, chroma sampling resolution may vary from luma sampling resolution, for example when a 4:2:2 or 4:2:0 sampling format is used. In such embodiments, encoding parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decoded image data, the filter block 62 may filter the reconstructed image data (e.g., reconstructed chroma image data and/or reconstructed luma image data). In some embodiments, the filter block 62 may perform deblocking and/or sample adaptive offset (SAO) functions. For example, the filter block 62 may perform deblocking on the reconstructed image data to reduce perceivability of blocking artifacts that may be introduced. Additionally, the filter block 62 may perform a sample adaptive offset function by adding offsets to portions of the reconstructed image data.

To enable decoding, encoding parameters used to generate encoded image data may be communicated to a decoding device. In some embodiments, the encoding parameters may include the encoding parameters determined by the mode decision block 58 (e.g., prediction unit configuration and/or transform unit configuration), encoding parameters used by the reconstruction block 60 (e.g., quantization coefficients), and encoding parameters used by the filter block 62. To facilitate communication, the encoding parameters may be expressed as syntax elements. For example, a first syntax element may indicate a prediction mode (e.g., inter prediction mode or intra prediction mode), a second syntax element may indicate a quantization coefficient, a third syntax element may indicate configuration of prediction units, and a fourth syntax element may indicate configuration of transform units.

The transcode pipeline 50 may then convert a bin stream, which is representative of syntax elements generated by the main encoding pipeline 48, to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

Additionally, the video encoding system 34 may be communicatively coupled to an output. In this manner, the video encoding system 34 may output encoded (e.g., compressed) image data to such an output, for example, for storage and/or transmission. Thus, in some embodiments, the local memory 20, the main memory storage device 22, the network interface 24, the I/O ports 16, the controller memory 44, or any combination thereof may serve as an output.

As described above, the duration provided for encoding image data may be limited, particularly to enable real-time or near real-time display and/or transmission. To improve operational efficiency (e.g., operating duration and/or power consumption) of the main encoding pipeline 48, the low resolution pipeline 46 may include a scaler block 66 and a low resolution motion estimation (ME) block 68. The scaler block 66 may receive image data and downscale the image data (e.g., a coding unit) to generate low resolution image data. For example, the scaler block 66 may downscale a 32×32 coding unit to one-sixteenth resolution to generate an 8×8 downscaled coding unit.

Moreover, as will be described in more detail below, the low resolution motion estimation block 68 may improve operational efficiency by initializing the motion estimation block 52 with candidate inter prediction modes, which may facilitate reducing searches performed by the motion estimation block 52. Additionally, the low resolution motion estimation block 68 may improve operational efficiency by generating global motion statistics that may be utilized by the motion estimation block 52 to determine a global motion vector.

Figure 7:
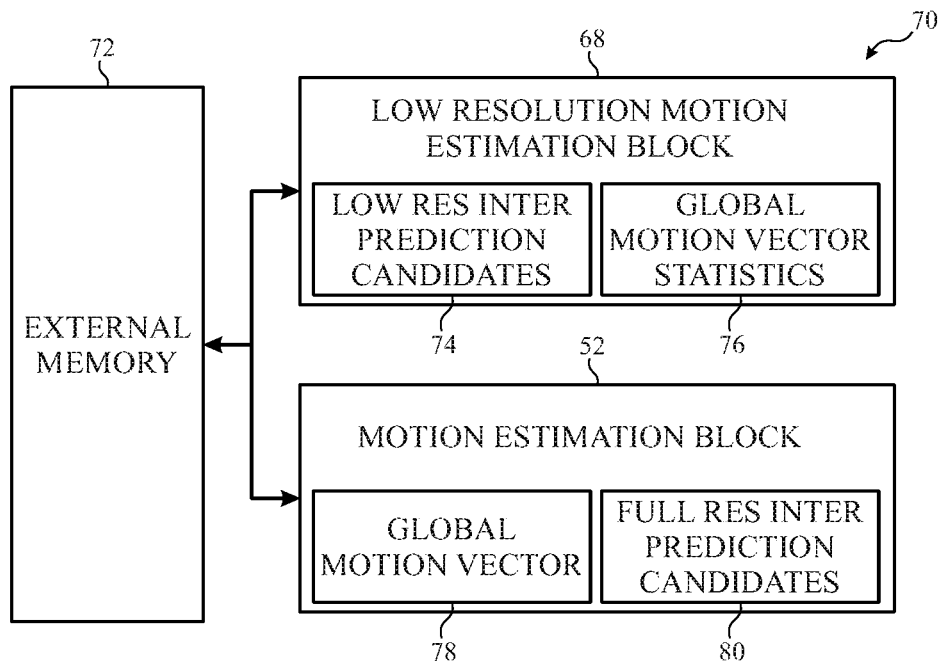
FIG. 7 is block diagram of a portion of the video encoding system of FIG. 6 including a low resolution motion estimation block and a motion estimation block, in accordance with an embodiment.

To help illustrate, a portion 70 of the video encoding system 34, which includes the low resolution motion estimation block 68 and the motion estimation block 52 coupled to external memory 72, is shown in FIG. 7. In some embodiments, the external memory 72 may be a tangible, non-transitory, computer-readable medium accessible by the video encoding system 34, for example, to store data and/or retrieve data, such as image data and/or statistics data. Accordingly, in some embodiments, the external memory 72 may be included in the controller memory 44, the local memory 20, or the main memory storage device 22. In other embodiments, the external memory 72 may be a separate storage component dedicated to the video encoding system 34.

In any case, as depicted, the external memory 72 is communicatively coupled to the low resolution motion estimation block 68 and the motion estimation block 52 of the main encoding pipeline 48. In some embodiments, the external memory 72 may provide direct memory access (DMA) that enables the low resolution motion estimation block 68 and the main encoding pipeline 48 to access the external memory 72 relative independently. Thus, in such embodiments, the low resolution motion estimation block 68 may process image frames in advance of the main encoding pipeline 48, which may enable the low resolution motion estimation block 68 to determine information (e.g., low resolution candidate inter prediction modes and/or motion vector statistics) useful for the main encoding pipeline 48, particularly the motion estimation block 52 and the mode decision block 58.

For example, the low resolution motion estimation block 68 may analyze low resolution image data to determine one or more low resolution inter prediction mode candidates 74, which may be analyzed as full resolution inter prediction mode candidates 80 by the motion estimation block 52. To facilitate improving operational efficiency, in some embodiments, the low resolution motion estimation block 68 may prune the low resolution inter prediction mode candidates 74 before they are evaluated by the motion estimation block 52, for example, to consolidate low resolution inter prediction mode candidates 74 that indicate similar motion vectors.

Additionally or alternatively, the low resolution motion estimation block 68 may determine global motion vector statistics 76 based at least in part on the low resolution inter prediction mode candidates 74. In some embodiments, the global motion vector statistics 76 determined by the low resolution motion estimation block 68 may facilitate image stabilization. Additionally, in some embodiments, the low resolution motion estimation block 68 may determine similar portions of successively displayed images to determine trends in motion, for example, as a global motion vector. Based on the motion trends, successively displayed image frames may be stabilized. In this manner, the low resolution motion estimation block 68 may determine the global motion vector statistics 76 that are useful for improving operational efficiency of the main encoding pipeline 48 and, thus, may facilitate real-time or near real-time transmission and/or display of image data.

Furthermore, the low resolution inter prediction mode candidates 74 and global motion vector statistics 76 may be utilized by the motion estimation block 52 of the main encoding system 34 to determine a global motion vector 78 and full resolution inter prediction mode candidates 80. In some embodiments, the global motion vector 78 may be indicative of motion trends across multiple image and, thus, may be used by the motion estimation block 52 to improve the evaluated full resolution inter prediction mode candidates 80, for example, by offsetting a full resolution inter prediction mode candidate 80 to compensate for the motion trend.

Returning briefly to FIG. 6, the inter prediction block 54 may determine luma prediction samples by applying each of full resolution inter prediction mode candidates 80. Additionally, as described above, the mode decision block 58 may consider one or more candidate intra predictions modes and corresponding luma prediction samples to determine a candidate intra prediction mode and corresponding luma prediction sample for a prediction unit, which the reconstruction block 60 may use to generate reconstructed image data.

Figure 8:
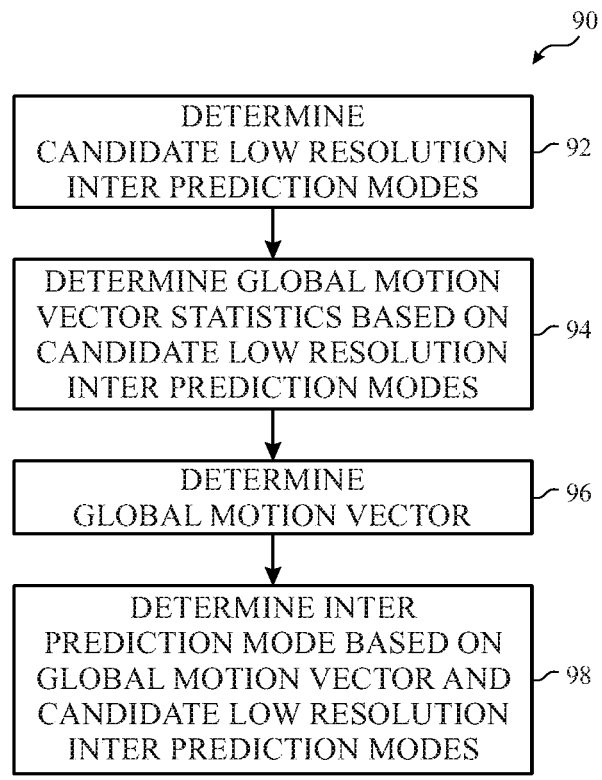
FIG. 8 is a flow diagram of a process for operating the low resolution motion estimation block and the motion estimation block of FIG. 7, in accordance with an embodiment.

To help further illustrate, an example of a process 90 for operating a low resolution motion estimation block 68 and a motion estimation block 52, which may be implemented in a video encoding system 34, is described in FIG. 8. Generally, the process 90 includes determining candidate low resolution inter prediction modes (process block 92), determining global motion vector statistics based on the candidate low resolution inter prediction modes (process block 94), determining a global motion vector (process block 96), and determining an inter prediction mode based on the global motion vector and the candidate low resolution inter prediction modes (process block 98). In some embodiments, the process 90 may be implemented at least in part based on circuit connections formed (e.g., programmed) in the video encoding system 34. Additionally or alternatively, the process 90 may be implemented at least in part by executing instructions stored in a tangible non-transitory computer-readable medium, such as the controller memory 44, using processing circuitry, such as the controller processor 42.

Accordingly, in such embodiments, a controller 40 may instruct the low resolution motion estimation block 68 to determine low resolution inter prediction mode candidates 74 (process block 92). For example, the low resolution motion estimation block 68 may analyze downscaled source image data to identify one or more downscaled reference samples. Additionally, the low resolution motion estimation block 68 may determine a lower resolution inter prediction mode (e.g., motion vector and/or reference index) indicative of the location of a corresponding reference sample.

Figure 9:
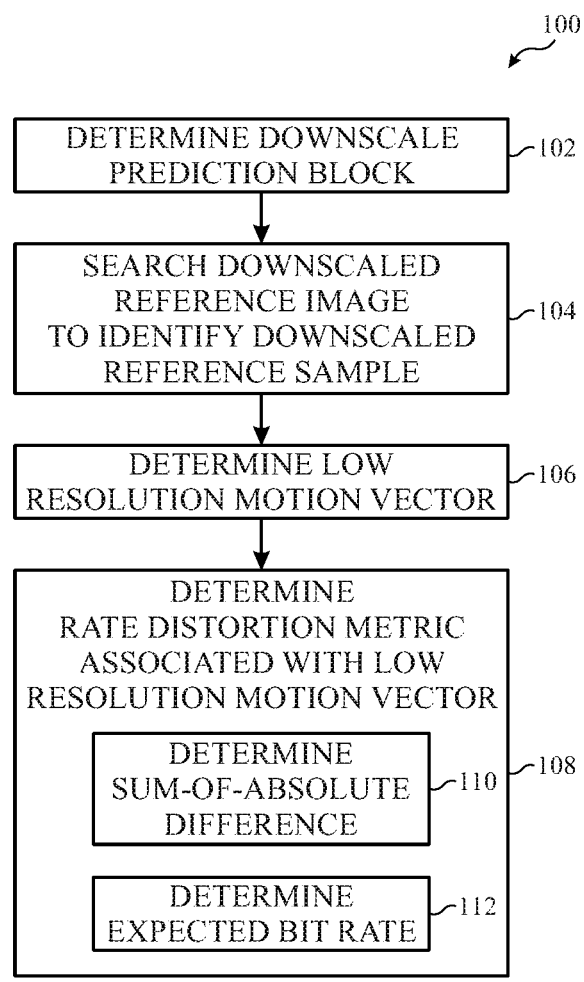
FIG. 9 is a flow diagram of a process for determining low resolution inter prediction modes, in accordance with an embodiment.

To help further illustrate, an example of a process 100 for determining a candidate low resolution inter prediction mode is described in FIG. 9. Generally, the process 100 includes determining a downscaled prediction block (process block 102), searching downscaled reference image data to identify a downscaled reference sample (process block 104), determining a low resolution motion vector based on location of the downscaled reference sample (process block 106), and determining a rate-match metric associated with the low resolution motion vector (process block 108). In some embodiments, the process 100 may be implemented at least in part based on circuit connections formed (e.g., programmed) in the video encoding system 34. Additionally or alternatively, the process 100 may be implemented at least in part by executing instructions stored in a tangible non-transitory computer-readable medium, such as the controller memory 44, using processing circuitry, such as the controller processor 42.

Accordingly, in some embodiments, a controller 40 may instruct the low resolution motion estimation block 68 to determine a downscaled prediction block (process block 102). For example, the low resolution motion estimation block 68 may process a downscaled coding unit, such as a downscaled luma coding block. Additionally, as described above, a coding unit may include one or more prediction units, such as a luma prediction block.

Figure 10:
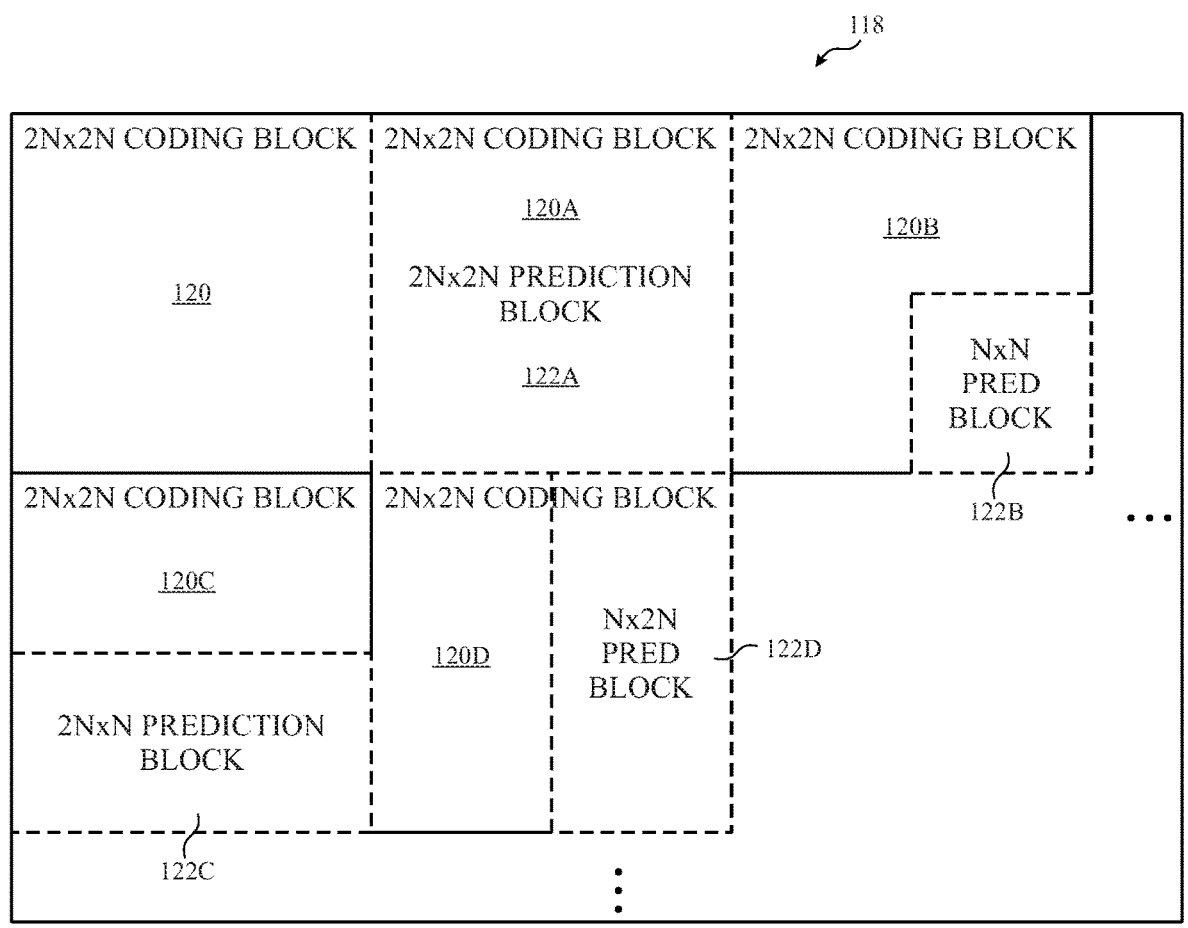
FIG. 10 is a diagrammatic representation of prediction blocks in an image, in accordance with an embodiment.

To help illustrate, a diagrammatic representation of an image 118 divided into coding blocks and prediction blocks is shown in FIG. 10. In particular, the image 118 is divided into 2N×2N coding blocks 120. For example, the 2N×2N coding blocks 120 may be 32×32 coding blocks. Additionally, as depicted, each 2N×2N coding block 120 is divided into one or more prediction blocks 122.

In some embodiments, the prediction blocks 122 may be of various sizes or dimensions. For example, a first coding block 120A may include a 2N×2N prediction block 122A, a second coding block 120B may include four N×N prediction blocks 122B, a third coding block 120C may include two 2N×N prediction blocks 120C, and a fourth coding block 120D may include two N×2N prediction blocks 120D. In other words, when the 2N×2N coding blocks 120 are 32×32 coding blocks, the 2N×2N prediction block 122A may be a 32×32 prediction block, the N×N prediction blocks 122B may each be a 16×16 prediction block, the 2N×N prediction blocks 122C may each be a 32×16 prediction block, and the N×2N prediction blocks 122D may each be a 16×32 prediction block.

Additionally, as noted above, a low resolution motion estimation block 68 may downscale coding blocks and, thus, prediction blocks within the coding blocks. In some embodiments, the low resolution motion estimation block 68 may downscale (e.g., down sample or sub-sample) in a horizontal direction and/or a vertical direction. For example, when downscaled by a factor of four in both the horizontal direction and the vertical direction, a 32×32 (e.g., 2N×2N) coding block may result in an 8×8 downscaled coding block. Additionally, a 16×16 (e.g., N×N) prediction block may result in a 4×4 downscaled prediction block, a 32×16 (e.g., 2N×N) prediction block may result in an 8×4 downscaled prediction block, and a 16×32 (e.g., N×2N) prediction block may result in a 4×8 downscaled prediction block. In this manner, a low resolution motion estimation block 68 may determine one or more downscaled prediction blocks.

Returning to the process 100 of FIG. 9, the low resolution motion estimation block 68 may search downscaled image data corresponding with a reference image to identify one or more downscaled reference samples, which may be used to predict the downscaled prediction block (process block 104). In some embodiments, the downscaled reference image data may be previously downscaled source image data, for example, corresponding to other image frames. In other words, the downscaled source image data corresponding with the downscaled prediction block may be searched when the low resolution motion estimation block 68 subsequently processes another image.

In any case, in some embodiments, the low resolution motion estimation block 68 may search the downscaled reference image data to determine one or more downscaled reference samples that are similar to luma of the downscaled prediction block. In some embodiments, the low resolution motion estimation block 68 may determine a degree of matching between a downscaled reference sample and the downscaled source image data corresponding with the downscaled prediction block. For example, the low resolution motion estimation block 68 may determine a match metric, such as sum of absolute difference (SAD) between luma of the downscaled prediction block and luma of the downscaled reference sample.

As described above, a coding unit may include one or more luma prediction blocks, which is each encoded using the same prediction technique. Additionally, as described above, a coding unit may utilize various prediction mode configurations (e.g., number, size, location, and/or prediction modes for the one or more luma prediction blocks). Thus, in such embodiments, the low resolution motion estimation block 68 may determine one or more downscaled reference samples for variously sized downscaled prediction blocks in a downscaled coding block.

After a downscaled reference sample is determined, the low resolution motion estimation block 68 may determine a motion vector (e.g., a low resolution motion vector) that indicates location of the downscaled reference sample relative to the downscaled prediction block (process block 106). As described above, a motion vector may indicate spatial position of a reference sample in the reference image frame relative to a prediction unit in the current image frame. Additionally, the reference sample may include blocks of image data that form a prediction block. Accordingly, in some embodiments, the low resolution motion estimation block 68 may determine a motion vector by determining a horizontal offset (e.g., mvX) and a vertical offset (e.g., mvY) between a prediction unit corresponding with the downscaled luma prediction block and a reference sample corresponding with a downscaled reference sample. In this manner, the low resolution motion estimation block 68 may determine one or more low resolution inter prediction mode (e.g., motion vector and reference index) candidates 74.

Additionally, the low resolution motion estimation block 68 may determine a rate-match metric associated with one or more identified motion vectors (process block 108). In some embodiments, motion vector candidates may be sorted based on associated rate-match metrics (e.g., costs). In some embodiments, the rate-match metric may be determined as follows:

$$RM = C(\text{rate}) + D(\text{match}) \qquad (2)$$

where RM is the rate-match metric, rate is an estimated rate that indicates number of bits expected to be used to indicate a motion vector candidate (e.g., based at least in part on motion vector difference), match is a match metric (e.g., sum of absolute difference) associated with a reference sample identified by the motion vector candidate, C is a weighting factor for the estimated rate, and D is a weighting factor for the match metric. The weighting factor C may be a Lagrangian multiplier, and the weighting factor C may depend on a quantization parameter associated with image data being processed.

The match metric may be indicative of matching degree between source image data and the reference sample identified by the motion vector candidate. As described above, in some embodiments, the match metric may be the sum of absolute difference (SAD) and/or the sum of absolute transformed difference (SATD) between a luma prediction block and luma of the reference sample and, thus, indicative of full resolution matching degree. Additionally or alternatively, the match metric may be the sum of absolute difference (SAD) and/or the sum of absolute transformed difference (SATD) between a downscaled luma prediction block and luma of a downscaled reference sample and, thus, indicative of downscaled matching degree.

Thus, in some embodiments, determining the one or more rate-match metrics may include determining one or more sum-of-absolute differences (process sub-block 110) and determining one or more expected bit rates of one or more motion vectors in the one or more inter prediction modes (process sub-block 112). For instance, the low resolution motion estimation block 68 may determine one or more sum-of-absolute differences between luma of downscaled source image data and luma of one or more downscaled prediction blocks 122 (process sub-block 110). Additionally, the low resolution motion estimation block 68 may determine estimated rate of one or more motion vectors in the one or more low resolution inter prediction modes (process sub-block 112). As described above, the estimated rate may include number of bits expected to be used to indicate the motion vector. Thus, the estimated rate may depend at least in part on how the motion vector is expected to be indicated. In some embodiments, the motion vector may be transmitted as a motion vector difference, which indicates change in horizontal offset and change in vertical offset from a previously transmitted motion vector. In such embodiments, the estimated rate of the motion vector may be the number of bits expected to be used to transmit the motion vector difference.

In fact, in some embodiments, the low resolution motion estimation block 68 may prune the low resolution inter prediction mode candidates 74 based on associated rate-match metrics. To help further illustrate, a process 130 for determining low resolution motion vectors is described in FIG. 11. Generally, the process 130 includes pruning 2N×2N low resolution motion vector candidates (process block 132), pruning N×N low resolution motion vector candidates based on the remaining 2N×2N low resolution motion vector candidates (process block 134), and outputting the remaining 2N×2N and N×N low resolution motion vector candidates (process block 136). In some embodiments, the process 130 may be implemented at least in part based on circuit connections formed (e.g., programmed) in the video encoding system 34. Additionally or alternatively, the process 130 may be implemented at least in part by executing instructions stored in a tangible non-transitory computer-readable medium, such as the controller memory 44, using processing circuitry, such as the controller processor 42.

A "motion vector candidate" refers to a motion vector associated with horizontal offset and vertical offset between a prediction block (e.g., corresponding with a downscaled luma prediction block) and a reference sample (e.g., corresponding with downscaled source image data). Motion vector candidates may be "pruned," or removed, from consideration as part of determining the low resolution motion vectors. For example, several motion vector candidates may be identified, but the low resolution motion estimation block 68 may only send some of the motion vector candidates or prediction mode candidates associated with some of the motion vector candidates to the motion estimation block 52. Accordingly, the controller 40 may instruct the low resolution motion estimation block 68 to prune 2N×2N low resolution motion vector candidates (process block 132).

Figure 12:
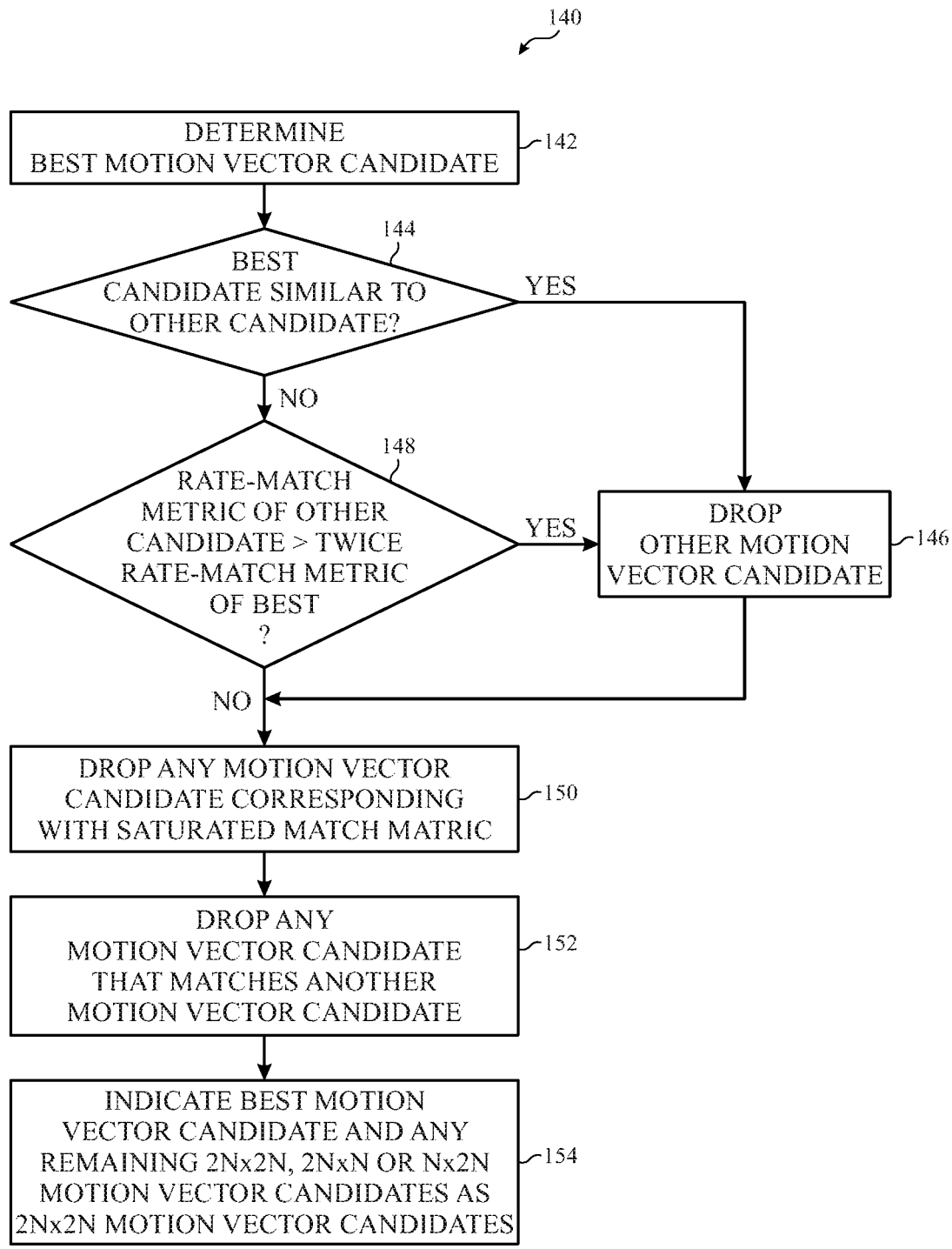
FIG. 12 is a flow diagram of a process for pruning 2N×2N motion vector candidates, in accordance with an embodiment.

An example of a process 140 for pruning 2N×2N motion vector candidates is described in FIG. 12. Generally the process 140 includes determining a best motion vector candidate (process block 142), determining whether the best motion vector candidate is similar to another motion vector candidate (decision block 144), determining whether a rate-match metric associated with the other motion vector candidate is greater than twice a rate-match metric associated with the best motion vector candidate (decision block 148), and dropping the other motion vector candidate from consideration when the other motion vector candidate is similar to the best motion vector and/or the rate-match metric associated with the other motion vector candidate is greater than twice the rate-match metric associated with the best motion vector candidate (process block 146).

Additionally, the process 140 includes dropping one or more motion vector candidates that results in a saturated match metric (process block 150), dropping 2N×N or N×2N motion vector candidates that match a 2N×2N motion vector candidate (process block 152), and indicating any remaining 2N×2N, 2N×N, or N×2N motion vector candidates as 2N×2N low resolution inter prediction mode candidates (process block 154). In some embodiments, the process 140 may be implemented at least in part based on circuit connections formed (e.g., programmed) in the video encoding system 34. Additionally or alternatively, the process 140 may be implemented at least in part by executing instructions stored in a tangible non-transitory computer-readable medium, such as the controller memory 44, using processing circuitry, such as the controller processor 42.

Accordingly, in some embodiments, a controller 40 may instruct the low resolution motion estimation block 68 to determine a best 2N×2N motion vector candidate, a best N×2N motion vector candidate, and/or a best 2N×N motion vector candidate (process block 142). For example, the low resolution motion estimation block 68 may determine 2N×2N motion vector candidates for a 2N×2N prediction block by determining low resolution motion vectors that each identifies a low resolution reference sample for a downscaled prediction block corresponding with the 2N×2N prediction block and scaling the low resolution motion vectors back to full resolution. Additionally, the low resolution motion estimation block 68 may determine a rate-match metric associated with each of the 2N×2N motion vector candidates, for example, based at least in part on number of bits expected to be used to indicate a 2N×2N motion vector candidate (e.g., based on differential from previous motion vector) and matching degree between the 2N×2N prediction block and a full resolution reference sample corresponding with a low resolution reference sample identified by the 2N×2N motion vector candidate. Furthermore, the low resolution motion estimation block 68 may sort one or more of the 2N×2N motion vector candidates from lowest (e.g., best) rate-match metric to highest (e.g., worst) rate-match metric. In a similar manner, the low resolution motion estimation block 68 may determine best motion vector candidates for other prediction block dimensions, for example, including the best 2N×N motion vector candidate for 2N×N prediction blocks in a 2N×2N coding block and/or the best N×2N motion vector candidate for N×2N prediction blocks in the 2N×2N coding block.

Additionally, the low resolution motion estimation block 68 may determine whether another motion vector candidate is similar to a best motion vector candidate associated with the same prediction block dimensions (decision block 144). For example, the low resolution motion estimation block 68 may determine whether a second best 2N×2N motion vector candidate is similar to the best 2N×2N motion vector candidate. Additionally, the low resolution motion estimation block 68 may determine whether a second best 2N×N motion vector candidate is similar to the best 2N×N motion vector candidate and/or whether a second best N×2N motion vector candidate is similar to the best N×2N motion vector candidate.

Figure 13:
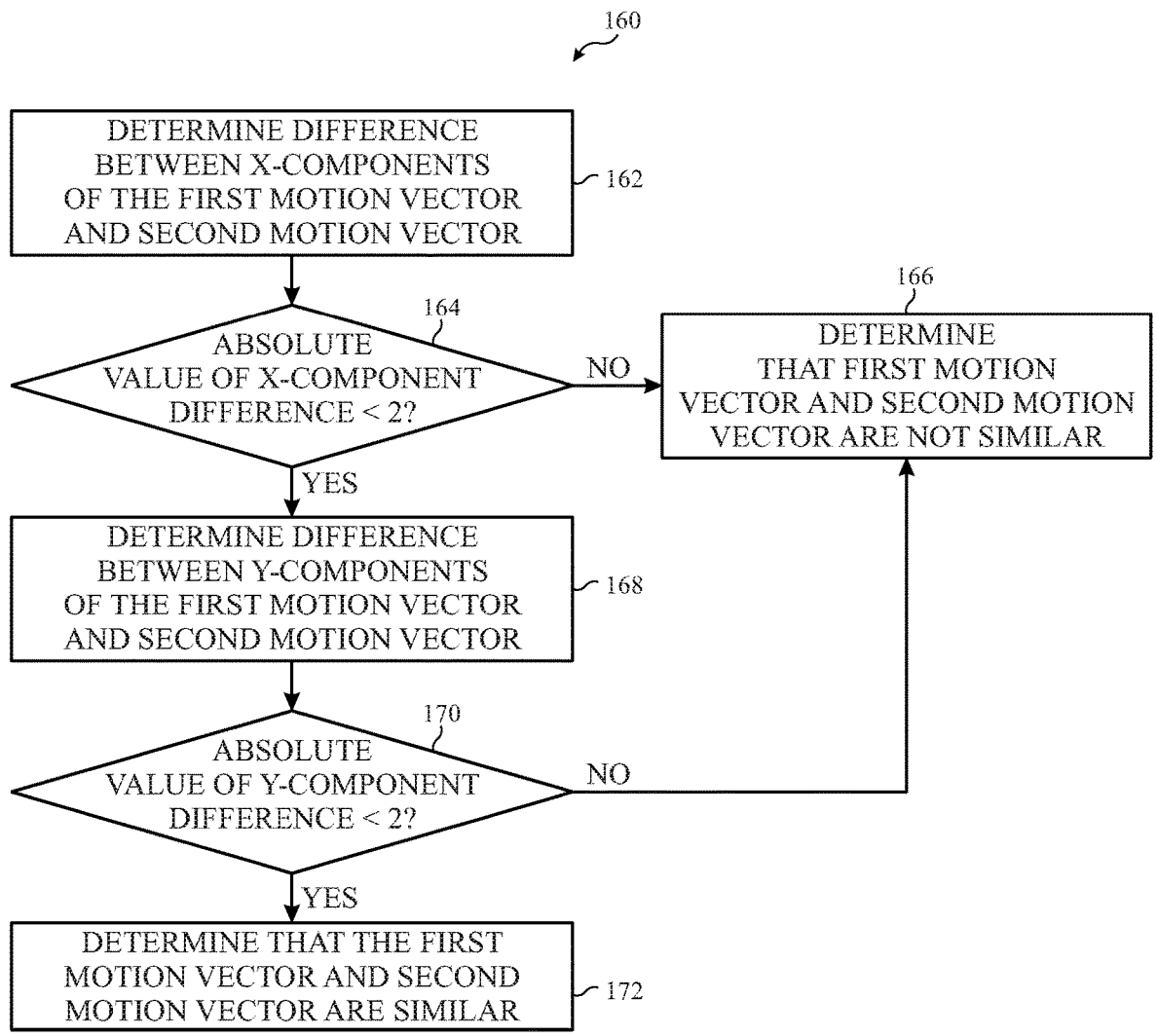
FIG. 13 is a flow diagram of a process for determining whether a motion vector is similar to another motion vector, in accordance with an embodiment.

In some embodiments, the low resolution motion estimation block 68 may determine similarity between motion vector candidates by comparing their horizontal and/or vertical components. To help illustrate, an example of a process 160 for determining whether two motion vectors are similar is described in FIG. 13. Generally, the process 160 includes determining a difference between the x-components of a first motion vector and a second motion vector (process block 162), determining whether an absolute value of a difference between the x-components of the first and second motion vectors is less than two (decision block 164), and determining that the first and second motion vectors are not similar to one another when the difference of the x-components of the first and second motion vectors is not less than two (process block 166).

Additionally, when the difference of the x-components of the first and second motion vectors is less than two, the process 160 includes determining a difference between the y-components of the first and second motion vectors (process block 168), determining whether an absolute value of the difference of the y-components of the first and second motion vectors is less than two (decision block 170), determining that the first and second motion vectors are not similar to one another when the difference between the y-components of the first and second motion vectors is not less than two (process block 166), and determining that the first and second motion vectors are similar to one another when the difference between the y-components of the first and second motion vectors is less than two (process block 172). In some embodiments, the process 160 may be implemented at least in part based on circuit connections formed (e.g., programmed) in the video encoding system 34. Additionally or alternatively, the process 160 may be implemented at least in part by executing instructions stored in a tangible non-transitory computer-readable medium, such as the controller memory 44, using processing circuitry, such as the controller processor 42.

For example, the low resolution motion estimation block 68 may determine that a best motion vector candidate is similar to another motion vector candidate when their horizontal (e.g., x-direction) components differ by at most one pixel position and their vertical (e.g., y-direction) components differ by at most one pixel position. In other words, the low resolution motion estimation block 68 may determine that motion vector candidates are similar when they identify directly adjacent pixel positions. When a best motion vector candidate is determined to be similar to another motion vector candidate, the low resolution motion estimation block 68 may drop the other motion vector candidate from consideration (process block 146).

Additionally, the controller 40 may instruct the low resolution motion estimation block 68 to determine whether the rate-match metric associated with another motion vector candidate is greater than two times the rate-match metric associated with the best motion vector candidate (decision block 148). For example, the low resolution motion estimation block 68 may determine whether a rate-match metric associated with the second best 2N×2N motion vector is more than twice the rate-match metric associated with the best 2N×2N motion vector candidate. Additionally, the low resolution motion estimation block 68 may determine whether a rate-match metric associated with the second best 2N×N motion vector is more than twice the rate-match metric associated with the best 2N×N motion vector candidate and/or whether a rate-match metric associated with the second best N×2N motion vector is more than twice the rate-match metric associated with the best N×2N motion vector candidate.

In other words, the low resolution motion estimation block 68 may determine whether a rate-match metric associated with another motion vector candidate exceeds a metric threshold (e.g., two times a rate-match metric associated with the best motion vector candidate). In other embodiments, the metric threshold may be greater than or less than two times the rate-match metric associated with the best motion vector candidate. When the rate-match metric associated with another motion vector candidate is determined to be greater than two times the rate-match metric associated with the best motion vector candidate, the low resolution motion estimation block 68 may drop the other motion vector candidate from consideration (process block 146).

Furthermore, the low resolution motion estimation block 68 may drop from consideration any motion vector candidates that result in a saturated match metric, for example, with the exception of the best 2N×2N motion vector candidate (process block 150). In other words, in some embodiments, the low resolution motion estimation block 68 may drop a second best 2N×2N motion vector candidate when it results in a saturated match metric. Additionally, the low resolution motion estimation block 68 to drop any 2N×N motion vector candidates and N×2N motion vector candidates that results in a saturated match metric.

In some embodiments, the low resolution motion estimation block 68 may determine whether a match metric (e.g., sum of absolute difference) associated with a motion vector candidate is saturated based at least in part on bit depth used to indicate match metrics. For example, the low resolution motion estimation block 68 determine whether a match metric is saturated by comparing the match metric with a saturation threshold set based at least in part on a maximum (e.g., saturated) value indicatable by the bit depth of the match metric. In any case, when a motion vector candidate is associated with a saturated match metric, the low resolution motion estimation block 68 may drop the motion vector candidate from consideration.

Additionally, the low resolution motion estimation block 68 may drop from consideration any 2N×N motion vector candidates and N×2N motion vector candidates that match a 2N×2N motion vector candidate (process block 152). In some cases, 2N×N motion vector candidates and/or N×2N motion vector candidates may be redundant in view of one or more 2N×2N motion vector candidates, for example, due to the 2N×N motion vector candidates and N×2N motion vector candidates being scaled up to 2N×2N motion vector candidates in the main encoding pipeline 48. As such, the low resolution motion estimation block 68 may drop from consideration 2N×N motion vector candidates, N×2N motion vector candidates, and/or 2N×2N motion vector candidates that are or may become redundant.

In any case, the low resolution motion estimation block 68 may indicate the best 2N×2N motion vector candidate along with any other remaining 2N×2N motion vector candidates, 2N×N motion vector candidates, and N×2N motion vector candidates as 2N×2N low resolution inter prediction mode candidates 74 (process block 154). In this manner, the low resolution motion estimation block 68 may prune the 2N×2N motion vector candidates and, thus, the corresponding 2N×2N low resolution inter prediction mode candidates 74 before consideration by the motion estimation block 52 implemented in the main encoding pipeline 48. At least in some instances, dropping (e.g., pruning) one or more 2N×2N low resolution inter prediction mode candidates 74 may facilitate improving processing efficiency of the motion estimation block 52, for example, by reducing number of full resolution inter prediction mode candidates 80 considered when dropped (e.g., pruned) 2N×2N low resolution inter prediction mode candidates 74 are not replaced with worse 2N×2N low resolution inter prediction mode candidates 74.

Furthermore, it should be noted that, in some embodiments, portions of the process 140 may be repeated for each motion vector candidate that is considered during execution of the process 140. For example, the controller 40 may instruct the low resolution motion estimation block 68 to determine whether the best motion vector candidate is similar to another motion vector candidate (decision block 144), determine whether a rate-match metric associated with the other motion vector candidate is greater than twice a rate-match metric associated with the best motion vector candidate (decision block 148), and drop the other motion vector candidate from consideration when the other motion vector candidate is similar to the best motion vector and/or the rate-match metric associated with the other motion vector candidate is greater than twice the rate-match metric associated with the best motion vector candidate (process block 146). Before dropping from consideration the any motion vector candidates that result in a saturated match metric (process block 150), the low resolution motion estimation block 68 determine whether the best motion vector candidate is similar to one or more other motion vector candidates (decision block 144), determine whether one or more rate-match metrics associated with the one or more other motion vector candidates are greater than twice a rate-match metric associated with the best motion vector candidate (decision block 148), and drop the one or more other motion vector candidates from consideration when the one or more other motion vectors candidate are similar to the best motion vector and/or the rate-match metrics associated with the one or more other motion vector candidates are greater than twice the rate-match metric associated with the best motion vector candidate (process block 146). In other words, before dropping motion vector candidates that result in a saturated match metric (process block 150), the low resolution estimation block may drop each motion vector candidate that is similar to the best motion vector candidate or that is associated with a rate-match metric that is greater than twice the rate-match metric associated with the best motion vector candidate.

Figure 11:
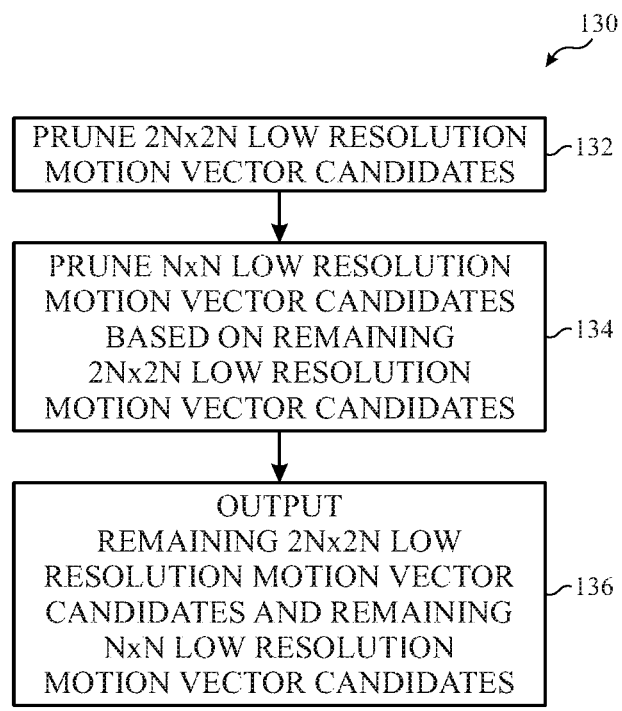
FIG. 11 is a flow diagram of a process for determining low resolution motion vectors, in accordance with an embodiment.
Figure 14:
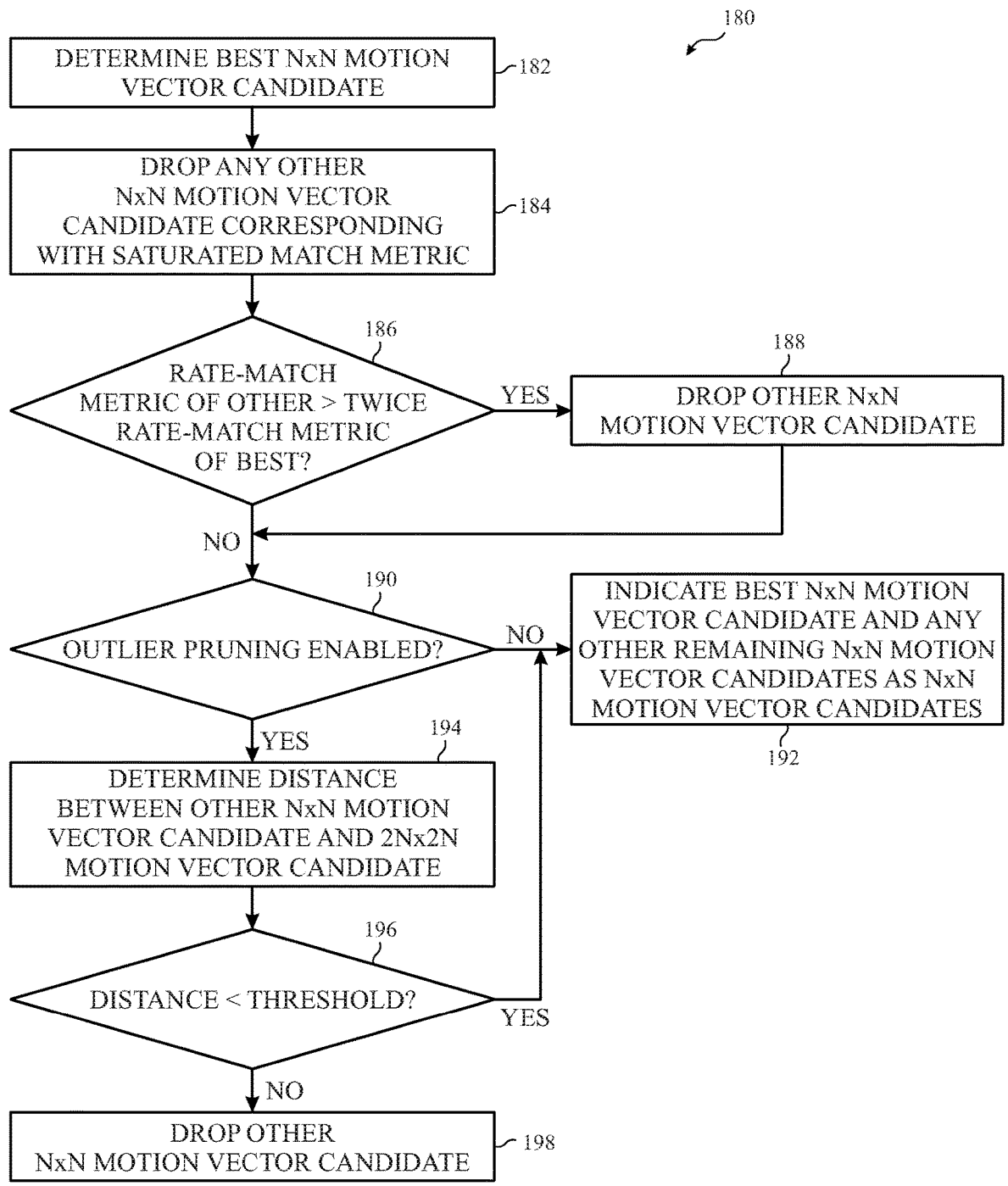
FIG. 14 is a flow diagram of a process for pruning N×N motion vector candidates, in accordance with an embodiment.

Returning to the process 130 of FIG. 11, the controller 40 may instruct the low resolution motion estimation block 68 to prune N×N motion vector candidates based on remaining 2N×2N motion vector candidates (process block 134). To help illustrate, an example of a process 180 for pruning N×N motion vector candidates is described in FIG. 14. Generally, the process 180 includes determining a best N×N motion vector candidate (process block 182), dropping from consideration any N×N motion vector candidates resulting in a saturated match metric (process block 184), determining whether a rate-match metric associated with another motion vector candidate is greater than two times a rate-match metric associated with the best N×N motion vector candidate (decision block 186), and dropping the other motion vector candidate from consideration when the other motion vector candidate is greater than two times the rate-match metric associated with the best N×N motion vector candidate (process block 188).

Additionally, the process 180 includes determining whether outlier pruning is enabled (decision block 190) and indicating the any remaining N×N motion vector candidates as N×N low resolution inter prediction mode candidates (process block 192). When outlier pruning is enabled, the process 180 includes determining distance between another N×N motion vector candidate and a 2N×2N motion vector candidate (process block 194), determining whether the distance is less than a distance threshold (decision block 196), and dropping from consideration the other N×N motion vector candidate when the distance is not less than the distance threshold (process block 198). In some embodiments, the process 180 may be implemented at least in part based on circuit connections formed (e.g., programmed) in the video encoding system 34. Additionally or alternatively, the process 180 may be implemented at least in part by executing instructions stored in a tangible non-transitory computer-readable medium, such as the controller memory 44, using processing circuitry, such as the controller processor 42.

Accordingly, in some embodiments, a controller 40 may instruct the low resolution motion estimation block 68 to determine a best N×N motion vector candidate (process block 182). In some embodiments, the low resolution motion estimation block 68 may sort N×N motion vector candidates based on associated rate-match metrics, for example, determined using equation (2). For example, the low resolution motion estimation block 68 may determine N×N motion vector candidates for N×N prediction blocks in a 2N×2N coding block by determining low resolution motion vectors that each identifies a low resolution reference sample for downscaled prediction blocks corresponding with the N×N prediction block and scaling the low resolution motion vectors back to full resolution.

The controller 40 may also instruct the low resolution motion estimation block 68 to drop from consideration any N×N motion vector candidates that result in a saturated match metric, for example, with the exception of the best N×N motion vector candidate (process block 184). In other words, in some embodiments, the low resolution motion estimation block 68 may drop a second best N×N motion vector candidate when it results in a saturated match metric, a third best N×N motion vector candidate when it results in a saturated match metric, and so on. In some embodiments, the low resolution motion estimation block 68 determine whether a match metric (e.g., sum of absolute difference) associated with a N×N motion vector candidate is saturated based at least in part on bit depth used to indicate match metrics. For example, the low resolution motion estimation block 68 determine whether a match metric is saturated by comparing the match metric with a saturation threshold set based at least in part on a maximum (e.g., saturated) value indicatable by the bit depth of the match metric. In any case, when an N×N motion vector candidate (e.g., other than the best N×N motion vector candidate) is associated with a saturated match metric, the low resolution motion estimation block 68 may drop the N×N motion vector candidate from consideration.

Additionally, the controller 40 may instruct the low resolution motion estimation block 68 to determine whether a rate-match metric associated with another N×N motion vector candidate is greater than two times a rate-match metric associated with the best N×N motion vector candidate (decision block 186). For example, the low resolution motion estimation block 68 may determine whether a rate-match metric associated with the second best N×N motion vector is more than twice the rate-match metric associated with the best N×N motion vector candidate, whether a rate-match metric associated with the third best N×N motion vector is more than twice the rate-match metric associated with the best N×N motion vector candidate, and so on.

In other words, the low resolution motion estimation block 68 may determine whether a rate-match metric associated with another N×N motion vector candidate exceeds a metric threshold (e.g., two times a rate-match metric associated with the best N×N motion vector candidate). In other embodiments, the metric threshold may be greater than or less than two times the rate-match metric associated with the best N×N motion vector candidate. When the rate-match metric associated with another N×N motion vector candidate is determined to be greater than two times the rate-match metric associated with the best N×N motion vector candidate, the low resolution motion estimation block 68 may drop the other N×N motion vector candidate from consideration (process block 188).

Additionally, the low resolution motion estimation block 68 may determine whether outlier pruning is enabled (decision block 190). In some embodiments, outlier pruning may be enabled and disabled via a programmable register in the low resolution motion estimation block 68. For example, the low resolution motion estimation block 68 may determine that outlier pruning is disabled when a "0" bit is stored in the programmable register and enabled when a "1" bit is stored in the programmable register.

When outlier pruning is enabled, the low resolution motion estimation block 68 may determine distance between a pixel position identified by a motion vector candidate included in a (remaining or non-pruned) 2N×2N low resolution inter prediction mode candidate and a pixel position identified by an N×N motion vector candidate, for example, other than the best N×N motion vector candidate (process block 194). In other words, in some embodiments, the pixel position identified by an N×N motion vector candidate may be compared with pixel positions identified by 2N×2N motion vector candidates, N×2N motion vector candidates, and/or 2N×N motion vector candidates. In some embodiments, the low resolution motion estimation block 68 may determine distance between pixel positions based on a sum of x-direction distance (e.g., absolute value of difference between x-components of motion vectors) and y-direction distance (e.g., absolute value of difference between y-components of motion vectors).

Additionally, the low resolution motion estimation block 68 may determine whether the distance between the pixel positions is less than a distance threshold (decision block 196). In some embodiments, the distance threshold may be predetermined and/or indicate number of pixel positions. Moreover, it should be noted that the low resolution motion estimation block 68 may determine whether a distance between an N×N motion vector candidate and a 2N×N or N×2N motion vector candidate exceeds the threshold value. In other words, the low resolution motion estimation block 68 may determine whether a distance between an N×N motion vector candidate and a 2N×2N, 2N×N, or N×2N motion vector candidate exceeds or is less than a threshold value. For example, in some embodiments, each distance associated with an N×N motion vector candidate may be compared to the threshold, any the low resolution motion estimation block 68 may perform an action described below based on the comparison of one or more such distances to the threshold value.

When the distance between the pixel positions is not less than the distance threshold, the low resolution motion estimation block 68 may determine that the N×N motion vector candidate is likely a noise outlier and, thus, drop the N×N motion vector candidate from consideration (process block 198). In any case, the low resolution motion estimation block 68 may indicate the best N×N motion vector candidate along with any other remaining N×N motion vector candidates as N×N low resolution inter prediction mode candidates 74 (process block 192). In this manner, the low resolution motion estimation block 68 may prune the N×N motion vector candidates and, thus, the corresponding N×N low resolution inter prediction mode candidates 74 before consideration by the motion estimation block 52 implemented in the main encoding pipeline 48. At least in some instances, dropping (e.g., pruning) one or more N×N low resolution inter prediction mode candidates 74 may facilitate improving processing efficiency of the motion estimation block 52, for example, by reducing number of full resolution inter prediction mode candidates 80 considered when dropped (e.g., pruned) N×N low resolution inter prediction mode candidates 74 are not replaced with worse N×N low resolution inter prediction mode candidates 74.

Furthermore, it should be noted that, in some embodiments, portions of the process 180 may be repeated for each motion vector candidate that is considered during performance of the process 180. For instance, the low resolution motion estimation block 68 may determine whether each rate-match metric associated with each motion vector candidate is greater than twice the rate-match metric associated with the best motion vector candidate (process block 186) before determining whether outlier pruning is enabled (process block 190). For example, each motion vector candidate that is associated with a rate-match metric that is not greater than twice the rate-match metric of the best motion vector candidate may be retained, and the retained motion vector candidates may subsequently be indicated as an N×N motion vector candidate (process block 192) or dropped from consideration (process block 198).

As another example of a portion of the process 180 that may be repeated, when the low resolution motion estimation block 68 determines that outlier pruning is enabled (decision block 190), the low resolution motion estimation block 68 may determine the distance between a pixel position identified by one or more motion vector candidates included in a (remaining or non-pruned) 2N×2N low resolution inter prediction mode candidate and a pixel position identified by one or more N×N motion vector candidates, for example, other than the best N×N motion vector candidate (process block 194). The low resolution motion estimation block 68 may also determine whether the distance associated with each of the motion vector candidates is less than a threshold (decision block 196). Motion vector candidates that are associated with distances less than the threshold may be retained, motion vector candidates that are associated with distances that are not less than the threshold may be dropped, and the retained motion vector candidates may be indicated as motion vector candidates (process block 192).

Returning to the process 130 of FIG. 11, the controller 40 may instruct the low resolution motion estimation block 68 to output the remaining 2N×2N low resolution inter prediction mode candidates 74 and the remaining N×N low resolution inter prediction mode candidates 74 (process block 136). As described above, low resolution inter prediction mode (e.g., motion vector and/or reference index) candidates 74 identified by the low resolution motion estimation block 68 may be evaluated by the motion estimation block 52 implemented in the main encoding pipeline 48 as full resolution inter prediction mode candidates 80. Thus, in some embodiments, the low resolution pipeline 46 may output the low resolution inter prediction mode candidates 74 for storage in external memory 72, and the main encoding pipeline 48 may retrieve the low resolution inter prediction mode candidates 74 from the external memory 72, for example, via DMA circuitry 36. In this manner, the low resolution pipeline 46 may determine and communicate one or more low resolution motion vector candidates to the main encoding pipeline 48.

Returning to the process 90 of FIG. 8, the controller 40 may instruct the low resolution motion estimation block 68 to determine global motion vector statistics based at least in part on the low resolution inter prediction mode candidates 74 (process block 94). To help illustrate, an example of a process 200 for determining global motion vector statistics is described in FIG. 15. Generally, the process 200 includes determining a best low resolution motion vector for each 2N×2N prediction block in an image (process block 202), determining a histogram of best low resolution motion vectors (process block 204), determining a peak motion vector based on a histogram bin count associated with the low resolution motion vectors (process block 206), and determining an average of the best low resolution motion vectors (process block 208). In some embodiments, the process 200 may be implemented at least in part based on circuit connections formed (e.g., programmed) in the video encoding system 34. Additionally or alternatively, the process 200 may be implemented at least in part by executing instructions stored in a tangible non-transitory computer-readable medium, such as the controller memory 44, using processing circuitry, such as the controller processor 42.

Accordingly, in some embodiments, the controller 40 may instruct the low resolution motion estimation block 68 to determine a best low resolution motion vector for each 2N×2N prediction block in an image (process block 202). The low resolution motion estimation block 68 may determine a best low resolution motion vector for a 2N×2N prediction block 122, such as prediction block 122a, from the low resolution motion vector candidates discussed above. For example, the low resolution motion estimation block 68 may execute instructions providing rules for selecting the best 2N×2N motion vector from the motion vector candidates.

Additionally, the controller 40 may instruct the low resolution motion estimation block 68 to determine a histogram of the best low resolution motion vectors associated with prediction blocks 122 (process block 204). For instance, each best low resolution vector (e.g., each 2N×2N, 2N×N, N×2N, and N×N motion vector) associated with a prediction block 122 in an image may be stored in a bin of a histogram of x and y coordinates for the best motion vectors associated with the 2N×2N prediction blocks of an image.

Figure 16:
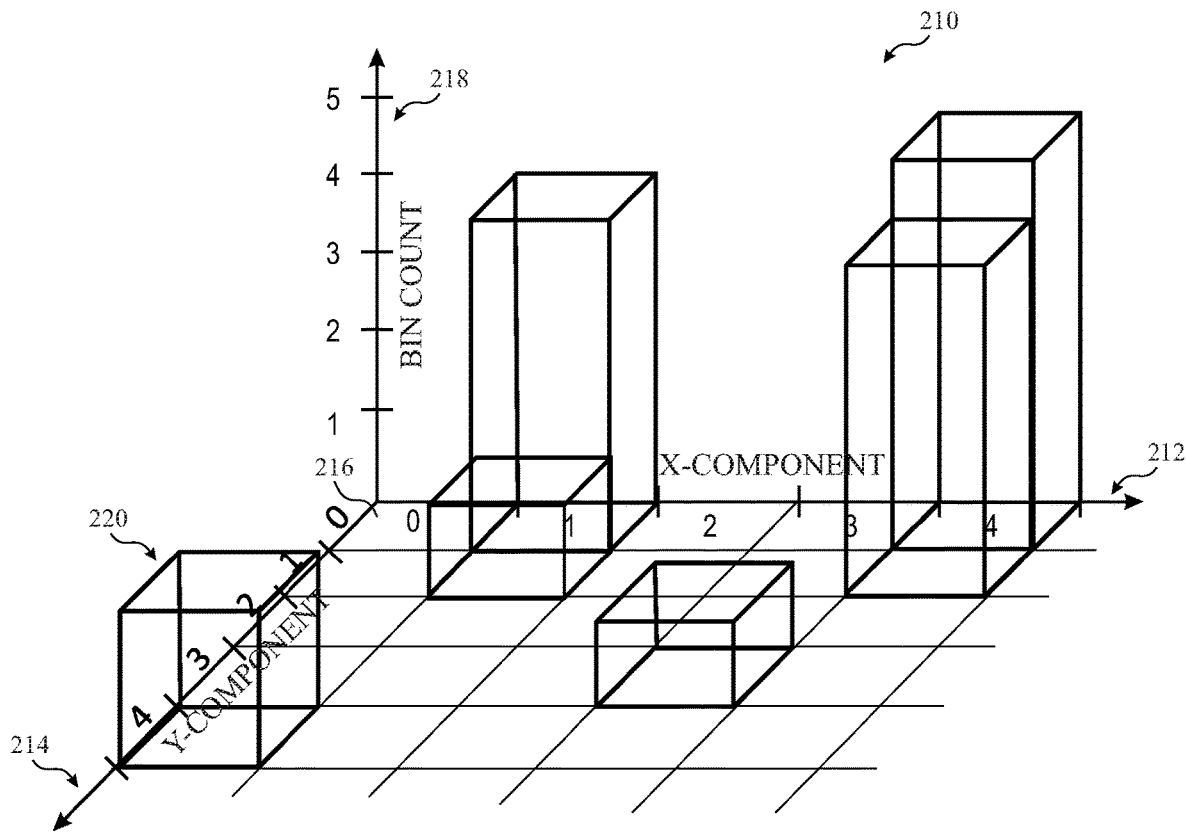
FIG. 16 is a diagrammatic representation of a motion vector histogram, in accordance with an embodiment.

To help illustrate, an example of a motion vector histogram 210 is shown in FIG. 16. As depicted, the motion vector histogram 210 includes a first axis 212 indicative of x-component values of best motion vectors and a second axis 214 indicative of y-component values of best motion vectors. The low resolution motion estimation block 68 may indicate each best motion vector by storing the x and y component values of the best motion vectors in an associated bin of the motion vector histogram 210. For example, a bin corresponding to motion vectors of (0, 0) is indicated by the area 216. That is, the area 216 corresponds to a motion vectors having an x-component of 0 and a y-component of 0. A third axis 218 of the motion vector histogram 210 indicates the bin count associated with a combination of a particular x-component and y-component. For example, a block 220 is indicative of two best motion vectors having x-components of 0 and y-components of 4.

Figure 15:
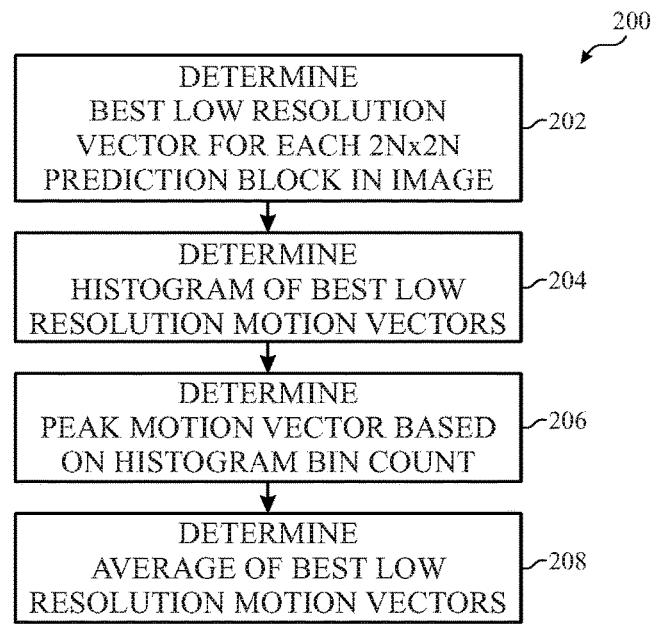
FIG. 15 is a flow diagram of a process for determining global motion statistics, in accordance with an embodiment.

Returning to the process 200 of FIG. 15, the low resolution motion estimation block 68 may determine a peak motion vector based on the histogram bin counts resulting from the low resolution motion vectors (process block 206). For example, the low resolution motion estimation block 68 may determine the motion vector with the highest bin count as indicated by the third axis 218 of the motion vector histogram 210 of FIG. 16. It should be noted that, in some embodiments, more than one peak value may be selected. For instance, the low resolution motion estimation block 68 may determine 2, 4, 6, 8, 10, or more motion vectors with the highest bin counts as indicated by the third axis 218 of the motion vector histogram 210.

Furthermore, the low resolution motion estimation block 68 may determine an average of the best low resolution motion vectors (process block 208). To determine the average, the low resolution motion estimation block 68 may determine the average value of the x-components and the average value of the y-components of the best motion vectors associated with the 2N×2N prediction blocks in the image. For example, the low resolution motion estimation block 68 may sum the x-components of the best motion vectors of the motion vector histogram 210, sum the y-components of the best motion vectors of the motion vector histogram 210, and divide each of those sums by the total number of 2N×2N motion prediction blocks in the picture to give an average x-component and an average y-component. It should be noted that, in other embodiments, the motion estimation block 52 may determine the average of the best low resolution motion vectors.

Figure 17:
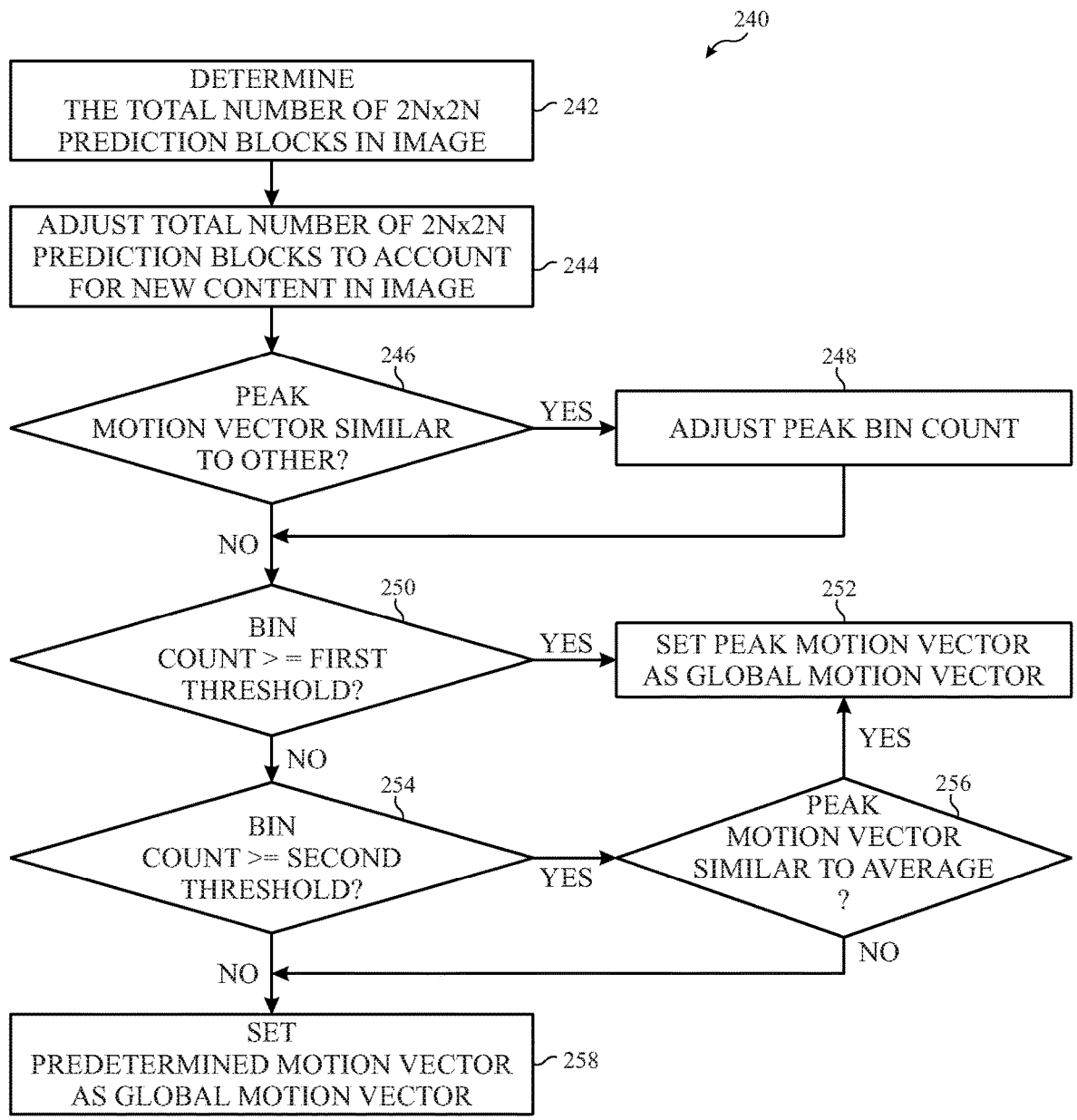
FIG. 17 is a flow diagram of a process for determining a global motion vector, in accordance with an embodiment.

Returning to the process 90 of FIG. 8, based at least in part on the global motion vector statistics, the video encoding system 34, controller processor 42, or the processor core complex 18 may determine a global motion vector 78 (process block 96). To help illustrate, an example of a process 240 for determining a global motion vector 78 is described in FIG. 17. Generally, the process 240 includes determining the total number of 2N×2N prediction blocks in an image (process block 242), adjusting the total number of 2N×2N prediction blocks to account for new content in the image relative to a reference image (process block 244), determining whether a peak motion vector is similar to another motion vector (decision block 246), adjusting a peak bin count when the peak motion vector is determined to be similar to the other motion vector (process block 248), determining whether the peak bin count is greater than or equal to a first threshold (decision block 250), determining whether the peak bin count is greater than or equal to a second threshold when the peak bin count is less than the first threshold (decision block 254), and setting the global motion vector to a predetermined value when the peak bin count is less than the second threshold (process block 258).

When the peak bin count is greater than or equal to the second threshold, the process 240 includes determining whether the peak motion vector is similar to an average motion vector (decision block 256). Additionally, the process 240 includes setting the peak motion vector as the global motion vector when the peak motion vector is similar to the average motion vector and/or the peak bin count is greater than the first threshold (process block 252). In some embodiments, the process 240 may be implemented at least in part based on circuit connections formed (e.g., programmed) in the video encoding system 34. Additionally or alternatively, the process 240 may be implemented at least in part by executing instructions stored in a tangible non-transitory computer-readable medium, such as the controller memory 44 or the memory 20, using processing circuitry, such as the controller processor 42 or the processor core complex 18.

Accordingly, in some embodiments, the processor core complex 18 may determine the total number of 2N×2N prediction blocks in an image (process block 242). In some cases, this determination may be made based on the global motion vector statistics 76. For example, the total number of 2N×2N blocks may have been determined by the low resolution motion estimation block 68 and stored in memory accessible to the motion estimation block 52, such as the external memory 72.

Additionally, the processor core complex 18 may adjust the total number of 2N×2N prediction blocks to account for new content in the image relative to a reference image (process block 224). For instance, new content in the image relative to a reference image may be associated with motion vectors that are dissimilar from motion vectors associated with content that is in both the image and the reference image. By adjusting the total number of 2N×2N prediction blocks, such as by eliminating 2N×2N prediction blocks associated with new content, a global motion vector that is more representative of real motion between the image and the reference image may be determined.

Moreover, based at least in part on the global motion vector statistics, the processor core complex 18 may determine a peak motion vector. For example, the processor core complex 18 may set the peak motion vector as a motion vector corresponding with a highest bin count in the motion vector histogram 210. Additionally, the processor core complex 18 may determine whether the peak motion vector is similar to another motion vector, for example, with a lower bin count in the motion vector histogram 210 (decision block 246). In some embodiments, the processor core complex 18 may determine whether the peak motion vector is similar to another motion vector using the process 160 of FIG. 13. For example, the processor core complex 18 may determine that the peak motion vector is similar to another motion vector when their horizontal (e.g., x-direction) components differ by at most one pixel position and their vertical (e.g., y-direction) components differ by at most one pixel position. In other words, the processor core complex 18 may determine that motion vectors are similar when they identify directly adjacent pixel positions.

When the peak motion vector is similar to another motion vector, the processor core complex 18 may adjust the bin count associated with the peak motion vector (process block 248). For example, the processor core complex 18 may increase the bin count associated with the peak motion vector by the bin count associated with the similar motion vector. It should be noted that, in some embodiments, the processor core complex 18 may compare the peak motion vector to multiple other motion vectors and adjust the bin count associated with the peak motion vector accordingly. For example, the processor core complex 18 may compare each motion vector to the peak motion vector and adjust the peak bin count as described above based on the comparison(s) of the peak motion vector to the other motion vector(s) before comparing the peak bin count to a threshold, which is discussed below.

Additionally, the processor core complex 18 may determine whether the peak bin count is greater than or equal to a first threshold (decision block 250). In some embodiments, the first threshold may be a predetermined value corresponding to a fraction of the total number of 2N×2N prediction blocks associated with an image. In other words, the processor core complex 18 may determine whether the peak bin count is greater than a fraction of the total number of 2N×2N motion vectors. For instance, the first threshold may be determined by finding the product of the total number of 2N×2N prediction blocks and a predetermined value between 0 and 1. When the peak bin count is greater than or equal to the first threshold value, the processor core complex 18 may set the peak motion vector as a global motion vector (process block 232). In other words, the processor core complex 18 may set the x-component and y-component of the global motion vector to be equal to the respective x-component and y-component of the peak motion vector.

On the other hand, when the peak bin count is less than the first threshold, the processor core complex 18 may determine whether the peak bin count is greater than or equal to a second threshold value (decision block 254). The second threshold value may be determined in the same manner as described above with relation to the first threshold. That is, the second threshold may be determined by multiplying the total number of 2N×2N prediction blocks with a predetermined value between 0 and 1. In some embodiments, the second threshold may be less than the first threshold. For instance, in one embodiment, the first threshold may be approximately one-half of the total number of 2N×2N prediction blocks associated with a particular image, while the second threshold may be approximately one-third of the total number of 2N×2N prediction blocks.

In any case, when the peak bin count is greater than or equal to the second threshold, the processor core complex 18 may determine whether the peak motion vector is similar to an average motion vector (decision block 256). In some embodiments, the average motion vector may be determined by calculating sums of the x-components and y-components of motion vectors of the motion vector histogram 210 and dividing those sums by the total number of 2N×2N prediction blocks. Additionally, in some embodiments, the processor core complex 18 may determine whether the peak motion vector is similar to the average motion vector using the processes 160 of FIG. 13. For example, the processor core complex 18 may determine that the peak motion vector is similar to average motion vector when their horizontal (e.g., x-direction) components differ by at most one pixel position and their vertical (e.g., y-direction) components differ by at most one pixel position. In other words, the processor core complex 18 may determine that motion vectors are similar when they identify directly adjacent pixel positions. When the peak motion vector is similar to the average motion vector, the processor core complex 18 may set the global motion vector to be equal to the peak motion vector (process block 252).

On the other hand, when the peak bin count is less than the second threshold or the peak motion vector is not similar to the average motion vector, the processor core complex 18 may set the global motion vector to have a predetermined x-component and a pre-determined y-component (process block 238). In some embodiments, the processor core complex 18 may set the global motion vector as (0, 0). In other words, in such embodiments, the processor core complex 18 may indicate that the image does not appear to follow a global motion trend. In any case, in this manner, a global motion vector may be determined for use by the motion estimation block 52.

Returning to the process 90 of FIG. 8, the motion estimation block 52 may determine full resolution inter prediction mode candidates 80 based on the global motion vector and the low resolution inter prediction mode candidates 74 (process block 98). To help illustrate, an example of a process 280 for operating a motion estimation block 52, which may be implemented in the main encoding pipeline 48 is described in FIG. 18. Generally, the process 280 includes determining a search window based on a global motion vector (process block 282), adjusting a motion vector candidate based on the global motion vector (process block 284), determining a search area in the search window based on the motion vector candidate (process block 286), and performing a motion estimation search in the search area (process block 288). In some embodiments, the process 280 may be implemented at least in part based on circuit connections formed (e.g., programmed) in the video encoding system 34. Additionally or alternatively, the process 280 may be implemented at least in part by executing instructions stored in a tangible non-transitory computer-readable medium, such as the controller memory 44, using processing circuitry, such as the controller processor 42.

Figure 19:
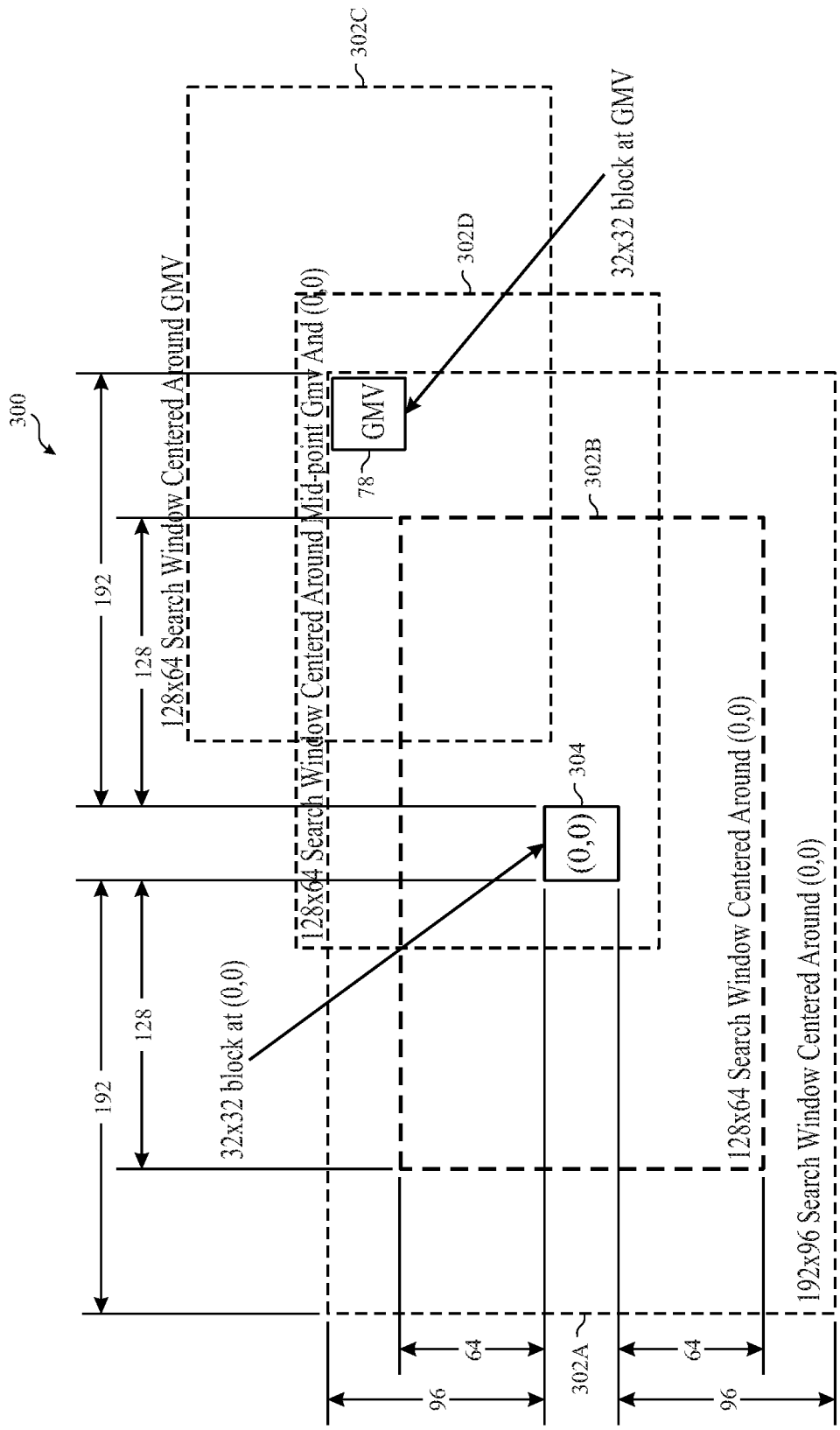
FIG. 19 is a diagram illustrating several search windows, in accordance with an embodiment.

Accordingly, in some embodiments, the motion estimation block 52 may determine a search window based at least in part on the global motion vector (process block 282). For example, the motion estimation block 52 may generate a default search window centered around a predetermined point, such as (0, 0). To help illustrate, FIG. 19 depicts a diagram 300 that includes several search windows 302. For instance, search windows 302A and 302B are search windows of two different sizes that are centered around a zero vector 304 (e.g., (0, 0)). The motion estimation block 52 may also modify the default search area based on the global motion vector 78. For example, the search window, such as search window 302C, may be centered around a point indicated by the global motion vector 78. Moreover, the motion estimation block 52 may modify the default search area by centering the search window halfway between (0, 0) and the point indicated by the global motion vector 78, which is illustrated by search window 302D. As illustrated, the search window 302D may include the points indicated by the global motion vector 78 and the zero vector (0, 0).

Search windows 302 may refer to a portion of an image stored in memory, such as internal memory 53 of the video encoding system 34. More specifically, upon determination of a search window 302, image data corresponding to pixels of an image that lie within the search window 302 may be stored in the internal memory 53 and searched by the motion estimation block 52. Furthermore, when search windows based on the global motion vector 78 (e.g., search windows 302C and 302D) are utilized, less memory may be utilized compared to when the search window 302A is used because search windows 302C and 302D have smaller areas than the search window 302A. Furthermore, due to the decrease in the area of the search windows 302C and 302D relative to search window 302A, the motion estimation block 52 may perform searches more efficiently, which may also result in a decrease in power consumed by the motion estimation block 52.

Figure 18:
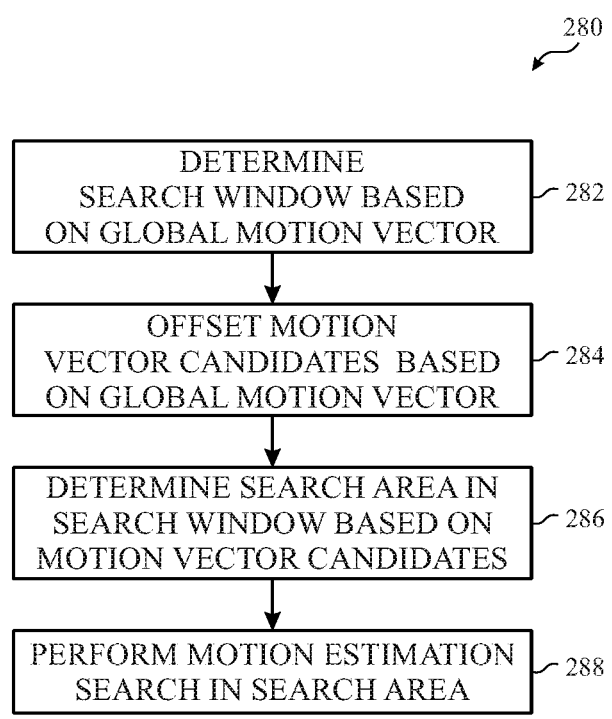
FIG. 18 is a flow diagram of a process for determining an inter prediction mode, in accordance with an embodiment.

Returning to the discussion of the process 280 of FIG. 18, the controller 40 may instruct the motion estimation block 52 to offset motion vector candidates based on the global motion vector 78 (process block 284). In particular, and as described below, the motion estimation block 52 may perform motion estimation searches within a search window 302 at points indicated by motion vector candidates. When the search window 302 is a search window 302 that is generated based on the global motion vector 78, such as search window 302C or 302D, the motion vector candidates may be generated based on the search window 302 being centered about the global motion vector 78. For instance, in some embodiments in which the global motion vector 78 is not utilized, motion vector candidates may be obtained based on searches around (0, 0). However, when utilizing the global motion vector 78, motion vector candidates may be obtained based on search around the global motion vector 78. In some embodiments, searches around (0, 0) may still be undertaken when utilizing the global motion vector 78. For instance, searches around both the global motion vector 78 and (0, 0) may be performed. Additionally, as discussed above, a search around a point between the global motion vector 78 and (0, 0) may be also be performed.

Furthermore, it should be noted that the low resolution motion estimation block 68 may perform searches over a larger area than the motion estimation block. For instance, the low resolution estimation block 68 may perform searches for motion vector candidates within search window 302A. Based on the identified motion vector candidates, the global motion vector 78 may be determined. And, as described above, a search may be performed based on the global motion vector 78. For instance, the motion estimation block 52 may search an area designated by search window 302C or search window 302D, both of which, as illustrated in FIG. 19, are smaller than the search area 302A.

Additionally, the controller 40 may instruct the motion estimation block 52 to determine a search area within the search window 302 based on the motion vector candidates (process block 286). For example, the motion estimation block 52 may determine a search area within the search window 302 that corresponds to a location within an image indicated by a motion vector candidate previously determined by the low resolution motion estimation block 68. In other words, the motion estimation block 52 may determine search areas that each include a location in an image indicated by a motion vector candidate. Additionally, in some embodiments, the motion estimation block 52 may determine search areas based on the global motion vector 78. For example, motion estimation block 52 may determine search areas corresponding to predetermined points in an image relative to a center point of the search window 302.

Furthermore, the controller 40 may instruct the motion estimation block 52 to perform motion estimation searches in the search areas (process block 288). For example, the motion estimation block 52 may search the search windows for reference samples within the search windows that are similar to a prediction unit. Furthermore, as described above, the motion estimation block 52 may determine a candidate inter prediction modes (e.g., reference index and motion vector) for each prediction unit based on motion estimation searches.

Accordingly, the technical effects of the present disclosure include improving operational efficiency of a video encoding system used to encode (e.g., compress) source image data. In some embodiments, the video encoding system may include a low resolution pipeline in parallel with a main encoding pipeline. In this manner, the low resolution pipeline may determine information, such as low resolution inter prediction modes and/or statistics, which may be used in the main encoding pipeline to improve operational efficiency. For example, low resolution inter prediction modes may provide an indication of where reference samples are expected to be located, which may reduce motion estimation searching performed by the main encoding pipeline. For instance, a global motion vector indicative of motion across multiple images may be determined based on the low resolution inter prediction modes.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A video encoding system configured to encode source image data corresponding with an image, the video encoding system comprising:
a first pipeline configured to:
receive first source image data corresponding with a first pixel block in the image;
perform a low resolution motion estimation search based on a first downscaled pixel block derived from the first pixel block to determine a first low resolution inter prediction mode, wherein the first low resolution inter prediction mode comprises at least one motion vector of a plurality of motion vectors; and
determine global motion vector statistics based at least in part on the first low resolution inter prediction mode, wherein the global motion vector statistics comprise:
a peak motion vector of the plurality of motion vectors; and
a plurality of bin counts, wherein the plurality of bin counts comprises a peak bin count associated with the peak motion vector; and
a second pipeline configured to:
receive the first source image data;
determine, based on the global motion vector statistics, a global motion vector indicative of motion trend in the image at least in part by determining whether the peak bin count is greater than or equal to a threshold;
determine a search window based at least in part on the global motion vector; and
perform a full resolution motion estimation search in a search area within the search window to facilitate determining a prediction mode to be included in first encoding parameters to be used to encode the first source image data.

2. The video encoding system of claim 1, wherein the first pipeline comprises a low resolution motion estimation block configured to generate the first downscaled pixel block by downscaling a resolution of the first source image data.

3. The video encoding system of claim 1, wherein the second pipeline is configured to determine a first full resolution inter prediction mode based on the first low resolution inter prediction mode.

4. The video encoding system of claim 1, wherein the second pipeline is configured to perform the full resolution motion estimation search based on the first source image data corresponding with the first pixel block.

5. The video encoding system of claim 1, wherein the second pipeline comprises memory configured to store the search window.

6. The video encoding system of claim 1, wherein the global motion vector statistics comprise a motion vector histogram.

7. The video encoding system of claim 1, wherein the search area comprises a point indicated by the global motion vector.

8. The video encoding system of claim 7, wherein the search area comprises a second point indicated by a zero vector.

9. An electronic device comprising:
an image data source configured to generate image data corresponding with a first image frame;
a first pipeline configured to:
receive first source image data corresponding with a first pixel block in the first image frame;
perform a low resolution motion estimation search based on a first down scaled pixel block derived from the first pixel block to determine a first low resolution inter prediction mode, wherein the first low resolution inter prediction mode comprises at least one motion vector of a plurality of motion vectors; and
determine global motion vector statistics based at least in part on the first low resolution inter prediction mode, wherein the global motion vector statistics comprise:
a peak motion vector of the plurality of motion vectors; and
a plurality of bin counts, wherein the plurality of bin counts comprises a peak bin count associated with the peak motion vector; and
a second pipeline configured to:
receive the first source image data;
determine, based on the global motion vector statistics, a global motion vector indicative of motion trend in the first image frame at least in part by determining whether the peak bin count is greater than or equal to a first threshold;

determine a search window based at least in part on the global motion vector; and perform a full resolution motion estimation search in a first search area within the search window to facilitate determining a prediction mode to be included in first encoding parameters to be used to encode the first source image data.

10. The electronic device of claim 9, wherein the electronic device comprises a portable phone, a media player, a personal data organizer, a handheld game platform, a tablet device, a computer, or any combination thereof.

11. The electronic device of claim 9, wherein the electronic device comprises a portable phone, a tablet device, a notebook computer, or any combination thereof.

12. The electronic device of claim 9, wherein the second pipeline is configured to determine the global motion vector, at least in part, by:

determining whether the peak bin count is greater than or equal to a second threshold; and determining whether the peak motion vector is similar to an average motion vector, wherein the average motion vector corresponds to an average of the plurality of motion vectors.

13. The electronic device of claim 12, wherein the second pipeline is configured to determine the global motion vector by setting the peak motion vector as the global motion vector when the peak bin count is:

greater than or equal to the first threshold; or greater than or equal to the second threshold and the peak motion vector is similar to the average motion vector.

14. The electronic device of claim 9, comprising memory, wherein the second pipeline is configured to store in the search window in the memory.

15. The electronic device of claim 14, wherein the second pipeline comprises the memory.

16. A method comprising:

receiving, via a first first source image data corresponding with a first pixel block in an image;

performing, via the first pipeline, a low resolution motion estimation search based on a first downscaled pixel block derived from the first pixel block to determine a first low resolution inter prediction mode, wherein the first low resolution inter prediction mode comprises at least one motion vector of a plurality of motion vectors;

determining, via the first pipeline, global motion vector statistics based at least in part on the first low resolution inter prediction mode, wherein the global motion vector statistics comprise:

a peak motion vector of the plurality of motion vectors; and a plurality of bin counts, wherein the plurality of bin counts comprises a peak bin count associated with the peak motion vector;

determining, via a second pipeline and based on the global motion vector statistics, a global motion vector indicative of motion trend in the image at least in part by determining whether the peak bin count is greater than or equal to a first threshold:

determining, via the second pipeline, a search window based at least in part on the global motion vector; and performing, via the second pipeline, a full resolution motion estimation search in a first search area within the search window to facilitate determining a prediction mode to be included in first encoding parameters to be used to encode the first source image data.

17. The method of claim 16, comprising:

sending, via the first pipeline, the global motion vector statistics to be stored in internal memory; and receiving, via the second pipeline, the global motion vector statistics from the internal memory.

18. The method of claim 16, comprising receiving, via the second pipeline, the first source image data prior to determining the global motion vector.

19. The method of claim 16, wherein determining the global motion vector at least in part comprises determining whether the peak bin count is greater than or equal to a second threshold when the peak bin count is less than the first threshold.

20. The video encoding system of claim 1, wherein the second pipeline is configured to determine the global motion vector at least in part by setting the peak motion vector as the global motion vector when the peak bin count is greater than or equal to the threshold.

* * * * *